United States Patent
Takushima et al.

(10) Patent No.: US 6,224,976 B1
(45) Date of Patent: May 1, 2001

(54) ADHESIVE TRANSPARENT RESIN AND A COMPOSITE INCLUDING THE SAME

(75) Inventors: Hidenori Takushima, Saitama-ken; Riichiro Takeshita, Tochigi-ken; Kouji Futaki, Saitama; Yasuhiro Sakai, Saitama-ken, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/910,215

(22) Filed: Aug. 13, 1997

(30) Foreign Application Priority Data

| Aug. 14, 1996 | (JP) | 8-214748 |
| Aug. 14, 1996 | (JP) | 8-214749 |
| Aug. 14, 1996 | (JP) | 8-214753 |
| Aug. 14, 1996 | (JP) | 8-214754 |
| Aug. 14, 1996 | (JP) | 8-214756 |
| Mar. 21, 1997 | (JP) | 9-068283 |
| Apr. 23, 1997 | (JP) | 9-106405 |
| May 9, 1997 | (JP) | 9-119149 |
| Jun. 2, 1997 | (JP) | 9-144020 |
| Jun. 2, 1997 | (JP) | 9-144021 |
| Jun. 30, 1997 | (JP) | 9-174403 |
| Jun. 30, 1997 | (JP) | 9-174404 |

(51) Int. Cl.$^7$ .................... B32B 7/12; C09J 7/02
(52) U.S. Cl. .............. 428/355 R; 428/426; 428/430
(58) Field of Search ................ 428/355 R, 426, 428/430

(56) References Cited

U.S. PATENT DOCUMENTS

| 4,008,341 | 2/1977 | Kehr . |
| 4,020,233 | 4/1977 | Morgan . |
| 4,120,721 | 10/1978 | Ketley et al. . |
| 4,135,047 | 1/1979 | Morgan . |
| 4,591,653 | * 5/1986 | Kunimune et al. ......... 556/419 |
| 4,865,649 | * 9/1989 | Kashiwagi et al. ......... 106/287.16 |
| 5,594,214 | 1/1997 | Liao . |

FOREIGN PATENT DOCUMENTS

| 53-28959 | 8/1978 | (JP) . |
| 57-5252 | 1/1982 | (JP) . |
| 60-28291 | 7/1985 | (JP) . |
| 61-103927 | 5/1986 | (JP) . |
| 63-241076 | 10/1988 | (JP) . |
| 63-291922 | 11/1988 | (JP) . |
| 63-291924 | 11/1988 | (JP) . |
| 3126612 | 5/1991 | (JP) . |
| 3188179 | 8/1991 | (JP) . |
| 323058 | 1/1996 | (JP) . |
| 8-85712 | 4/1996 | (JP) . |
| 8112866 | 5/1996 | (JP) . |
| 8122504 | 5/1996 | (JP) . |

* cited by examiner

Primary Examiner—Daniel Zirker
(74) Attorney, Agent, or Firm—Greenblum & Bernstein, P.L.C.

(57) ABSTRACT

To provide a transparent resin which is suitable in the process of producing a coating for electronic materials, a glass having both of the scattering-preventing function and the antireflective function, an adhesive agent, a shock-absorbing material, an ultraviolet-cutting sheet for televisions, a filter for VDTs and a high refractive index primer composition as well as the process for the production of primer-coated lenses using said primer composition, is excellent in a coatability, adhesive property, storage stability, durability, shock resistance and the like, and is particularly excellent in a transparency and adhesive property after curing of the same.

A transparent resin having an adhesive property characterized by comprising a cured product of the polymerizing composition which comprises at least one of diallyl phthalate, diallyl isophthalate and diallyl terephthalate, and pentaerythritol tetra(3-mercaptopropionate).

19 Claims, 2 Drawing Sheets

ADHESIVE TRANSPARENT RESIN AND A COMPOSITE INCLUDING THE SAME

0001

FIELD OF THE INVENTION

The present invention relates to;

an ultraviolet (UV)-curable composition for forming a coating of electronic materials, such as a surface protective layer of semiconductors, an insulating layer of semiconductor-mounted devices, a surface protective coating of color filters in liquid crystal display devices, an insulating interlayer of multilayered printed circuits and a protective coating of light guiding materials or phase shifting materials, a glass having both of the scattering-preventing properties and the anti-reflective properties, which is useful for display devices, construction materials, lenses, automobile parts, furniture and others, an adhesive agent which shows only a little aging under a high temperature and high humidity conditions, and shows an excellent adhesion property with optical films, a shock-absorbing material, such as plate glass, glass articles, potteries and others, which can protect fragile articles liable to be damaged during transportation or storage, an easily removable ultraviolet (UV)-cutting sheet fixed onto a surface of glass, which is exposed to sunlight in various architectural structures, such as housing, buildings, traffic systems, vending machines, oceanic constructions, a easily removable UV-screening filter fixed onto a display surface of televisions, a filter for a shield for electromagnetic waves, and for shielding UV rays and preventing electrostatic charging in VDTs (visual display terminals) such as personal computers, word processors and other devices, and a transparent resin having a high adhesion property capable of constituting a high refractive index primer composition for plastic lenses.

0002

PRIOR ART

Recently, a variety of color liquid crystal display devices comprising a combination of a liquid crystal device and a color filter for color separation have become widely used. The color filter is generally constituted by a glass substrate, picture elements formed on the substrate, a layer of protective coating, and a transparent electrode of indium—tin oxide (ITO), in this order from the substrate. For the layer of protective coating, it is necessary to satisfy a wide range of properties such as;

an adhesion property to picture elements, glass, chromium used as a black matrix component, which constitute a lower layer of the device, an adhesion property to ITO constituting an upper layer, an adhesion property to an epoxy sealing agent constituting a liquid crystal cell, capabilities of shielding impurities of the picture elements, of smoothness, of wet heat resistance, of light fastness, of resistance to solvents, of chemical resistance, of dampness, of transparency, a capability of heat resistance required in the posterior-processing in the production of liquid crystal cells, and the like.

0003

Further, similar properties are required for a protective coating of the glass substrate. For materials for forming the protective coating, a heat curable composition, such as siloxane polymer, silicone polyimide and the like, has been particularly suggested in view of the heat resistance of the heat curable composition. The examples using the siloxane polymer are well-known from Japanese Unexamined Patent Publication (Kokai) Nos. 63-241076, 3-126612, 3-188179 and the like, and the examples using the silicone polyimide are well-known from Japanese Unexamined Patent Publication (Kokai) Nos. 61-103927, 63-291922 and the like. Further, in Japanese Unexamined Patent Publication (Kokai) No. 63-291924, the protective coatings of the color filters are suggested to be made of a curable composition consisting of siloxane polymer and silicone polyimide. The curable composition described in Japanese Kokai No. 63-291924 can show relatively superior properties as a protective coating of color filters, however, still needs improvements in terms of coatability, adhesion properties and a storability as liquid.

0004

Further, the prior art concerning anti-reflective glass having scattering-preventing properties is as follows: the glass is a material which has been used as a transparent part in a wide variety of articles for many years, and glass has been widely utilized in our daily lives owing to its excellent properties such as optical characteristics, mechanical properties, durability and other properties. In recent years, in order to improve visual recognition capability, a reflection-free glass has been used, in which a metal oxide such as a thin layer of magnesium fluoride is deposited or sputtered on a glass part of electronic equipments, optical articles, construction or building materials.

However, it is essential for reflection-free glass, when used in many fields of use, to always expose the surfaces to the atmosphere. For example, when the reflection-free glass is used as a construction material, particularly those for high-rise buildings, damage of the glass due to earthquakes and other causes will result in a very dangerous situation to the human body, because when the reflection-free grass is crushed, fragments fall onto the surface of the ground. Further, for indoor use, for example, when the reflection-free glass is used as a display of electric equipment, furniture and the like, there is a possibility that the glass crushed due to an unexpected accident causes injury. Furthermore, when the reflection-free glass is used as a part of the large-sized machine equipments in factories, there is a possibility that tiny particles of glass may further induce a more serious accident, namely, the degree of danger would be further increased.

0005

Furthermore, in many cases, the adhesive and the applications, such as adhesive tapes, adhesive sheets and others, which relate to the present invention are generally used at ordinary room temperature. However, the use is inevitably limited to a specific range, because the use of adhesives can result in drawbacks such as separation from a surface of the adherend, if the adhesive and the adhesive-applied products are exposed to conditions of high temperature and high humidity.

0006

Thus, as a means for solving the above problems of the adhesive, there have been suggested— a pressure-sensitive adhesive comprising an acrylic polymer and the incorporated vinyl silane, epoxy silane, methacryl silane or other silanes, an adhesive composition comprising an acrylic resin containing a hydroxyl group capable of reacting with an epoxy group and the incorporated epoxy group-containing silane, an adhesive composition comprising an acrylic resin copolymerized with an ethylenically unsaturated monomer capable of reacting with an isocyanate group and the incorporated isocyanate group-containing organosilicone compound, an adhesive composition comprising an acrylic resin having incorporated therein a silicate oligomer, and other compositions.

However, the above-mentioned means are insufficient to satisfy the requirements to an adhesion property under a high temperature and high humidity conditions. Particularly, the means do not provide a satisfactory suggestion concerning the adhesion property between a glass substrate and an optical film.

0007

Hitherto, when the plate or sheet glass is packed for a transportation purposes, wooden frames have been used as a packaging material. However, use of wooden frames causes a remarkable increase of bulk (or volume) of the packaged glass, i.e., two or more times of the volume of the plate glass itself to be packed, and contrary to such an increase of bulk, the resulting shock resistance is not always satisfactory to the requirements. Further, foamed plastic sheets, rugged sheets or other sheets have been utilized as packaging materials to transport or store glass articles or potteries, however, these sheets also can not always provide a sufficient shock resistance.

0008

When sunlight is irradiated onto various architectural structures or a glass surface thereof, there may be a loss of comfort to the occupants as a result of an increase of the temperature of the interior space of the structures. Further, there is a risk of the human health being adversely affected due to ultraviolet rays of the irradiated sunlight. Furthermore, because of an increase of the temperature of the articles disposed in the inside of a structure, the articles may cause a change in their color or properties. Thus, there has been an attempt to use films capable of cutting or screening the UV rays or near infrared (IR) rays from the sunlight.

A substrate film having applied on a surface of an UV-cut or near IR-cut coating is well-known as the above-mentioned type of the films, and (1) a method for coating a dye-containing film, (2) a method for coating a thin layer containing a metallic compound on a substrate, and (3) a method for adding an absorbing agent during production of glass or resin to be formed into the substrate, are proposed as the production methods. The principal object of these methods is to reduce transmittance of the UV and near-IR rays by adding a dye or absorbing agent.

However, these methods based on the addition of the dye or absorbing agent can merely retain their effects concerning the fastness only for about one to two years, because the added dye or absorbing agent per se is deteriorated in properties.

Further, for the prior art UV-cut films, it is difficult for laymen not skilled in the art to correctly laminate the film on a glass surface as the adherend without causing creases or rumples, and once it has been laminated, the film can not be removed from the glass surface.

0009

For the purpose of protecting the surface, the CRTs (cathode ray tubes) have been covered with a hard coated film. The CRTs, however, suffer from problems such as adhesion of dust, dirt on the film, and difficulties in viewing the CRT due to light emitted from fluorescent lamps or a window (reflective projection).

Further, with the increase of the workload of the VDT as a result of widespread use of personal computers and word processors, the health-hazard due to electromagnetic waves, ultraviolet rays and electrostatic charges generated or emitted from the CRT devices, as well as safety measures, have become a serious issue. In order to prevent the reflective projection of fluorescent lamps and light reflection from windows to the surface of the CRTs, which is a cause of visual difficulties, there has been suggested to use an anti-reflective filter, however, the fastening of such an anti-reflective filter to a CRT surface is troublesome.

As a countermeasure of the above problem, Japanese Unexamined Patent Publication (Kokai) No. 8-112866 teaches the application of an anti-static layer to a hard coated film to be adhered to the CRT surface, thereby preventing adhesion of dust and the like, and, at the same time, by forming depressions or projections on the surface of the hard coated film or anti-static layer, thereby obtaining a daze-preventing effect. However, the anti-static effect has not been satisfactory and therefore the adhesion of dust, dirt and the like can easily fire the eye shortly after the application of the anti-static layer.

Further, in the prior art hard coated films do not take any countermeasure against the ultraviolet rays emitted from the display surface of a television. The ultraviolet rays can cause a fatigue of the eyes.

Furthermore, recently, the importance of the effect on human health due to the electromagnetic waves is being made apparent, however, it is true to say that substantially all of hard coated films and CRT filters in the prior art do not take measures to protect the human eyes from electromagnetic waves and ultraviolet rays emitted from the CRTs.

0010

Generally, plastic lenses have been vulnerable to scratching, and therefore, in order to prevent scratching, a hard coated layer is usually applied to the surface of the lenses. Further, in order to prevent reflection on the lens surface, an anti-reflective layer consisting of the deposited inorganic materials is applied to the hard coated layer. However, plastic lenses having both an applied hard coated layer and an anti-reflective layer suffer from the drawback of a remarkably reduced shock resistance in comparison with the plastic lenses without applied layers or the plastic lenses with the hard coated layer only.

To solve the above drawbacks, it is well-known to insert a primer layer consisting of urethane resin between the plastic lens and the hard coated layer. However, since the urethane resin is formed by the thermal curing process, several hours for curing time may need until the primer layer is formed.

Moreover, for primers of the prior art, it was not possible to adjust interference fringes generated between the lens substrate and the hard coated layer.

0011

OBJECT OF THE INVENTION

The present invention has an object to provide a resin, which is suitable in the method of producing a coating for electronic materials;

a glass having both scattering-preventing properties and the anti-reflective properties, an adhesive agent;

a shock-absorbing material;
an ultraviolet(UV)-cutting sheet;
an ultraviolet-cutting sheet for televisions;
a filter for VDTs and
a high refractive index primer composition as well as a method for the production of primer-coated lenses using said primer composition,
the resin has excellent coatability, adhesive properties, storage stability, durability, shock resistance and the like, and is particularly excellent in a transparency and adhesion property after curing of the resin.

0012

The present invention has an object to provide an optical laminated plate having excellent durability and being more stable in the optical properties, the laminated plate using an adhesive which can retain the excellent adhesion property for an extended period of time under high temperature and high humidity conditions, and can indicate an excellent adhesion property and durability in the adhesion between a variety of optical films and a substrate such as glass.

0013

The present invention has another object to provide an ultraviolet (UV)-curable composition, which is suitable in the formation of coatings for electronic materials, such as a surface protective coating of semiconductors, an insulating layer of semiconductor-mounted devices, a surface protective coating of color filters of the liquid crystal display devices, an insulating interlayer of multilayered printed circuits, a protective coating of light guiding materials or phase shifting materials and other coatings, and which has excellent coatability, adhesive properties, storage stability, and also has excellent transparency properties.

0014

The present invention has an object to provide a glass having a scattering-preventing function along with an anti-reflective function, thereby increasing the safety of the reflection-free glass.

0015

The present invention has yet another object to provide a shock-absorbing material having a high shock resistance, which can greatly reduce the volume, and increases the efficiency of transportation, and also enables a simpler packing method.

0016

The present invention has an object to provide an ultraviolet-cutting sheet, which can be easily fixed and removed by laypersons, can be repeatedly used for many times, exhibits an excellent transparency and light fastness, has a high transmittance of visible radiations, and can effectively cut the ultraviolet rays.

0017

The present invention has yet another object to provide an ultraviolet-cutting filter for a television, which can effectively cut the ultraviolet rays without reducing transmittance of the visible radiations, and can curb uneven color shading, can prevent the generation of electrostatic charges, and can be easily attached and removed.

0018

The present invention has another object to provide an ultraviolet-cutting filter for VDTs, which can cut the ultraviolet rays while maintaining a transmittance of the visible radiations, can shield the electromagnetic waves, can prevent the generation of electrostatic charges, and can be easily attached and removed.

0019

The present invention has another object to provide a primer composition which enables formation of a primer layer within a shortened period of time, can increase a shock resistance of the plastic lenses, and can reduce interference fringes produced between the lens substrate and the hard coated layer, and a primer-coated lens with the primer layer.

0021

SUMMARY OF THE INVENTION

The transparent resin having an adhesion property according to the present invention comprises a cured product of polymerizing composition which comprises at least one of diallyl phthalate, diallyl isophthalate and diallyl terephthalate, and pentaerythritol tetra(3-mercaptopropionate).

In the above polymerizing composition, it is preferable that the at least one of diallyl phthalate, diallyl isophthalate and diallyl terephthalate, and the pentaerythritol tetra(3-mercaptpropionate) are contained in a ratio of 2:1 to 1:3 with regard to an equivalent ratio. The cured product is preferably produced by polymerizing the polymerizing composition by means of a photopolymerization initiator; and the amount of photopolymerization initiator is preferably 0.005 to 10% by weight. Further, an ultraviolet curing agent may be used as the photopolymerization initiator.

0022

In the adhesive transparent resin according to the present invention, an ultraviolet-absorbing agent or a refractive index-controlling material may be added as, for example, a substance for modifying optical properties and others to the polymerizing composition. It is preferable that the ultraviolet-absorbing agent is contained in an amount of 0.01 to 3.0% by weight. Also, it is possible to use a metallic compound as the refractive index-adjusting material.

0023

The adhesive transparent resin of the present invention is characterized by laminating another functional layer having different physical properties from those of the resin, thereby forming a composite. Suitable functional layers include an anti-reflective layer, an optical filter, a plastic film and the like.

0024

The adhesive or adhesive agent according to the present invention comprises a photocured product of the polymerizing composition which comprises at least one of diallyl phthalate, diallyl isophthalate and diallyl terephthalate, and pentaerythritol tetra(3-mercaptopropionate) in an equivalent ratio of 2:1 to 1:3.

0025

The present invention provides an optical laminated plate characterized by laminating a substrate and an optical film layer through an adhesive layer consisting of the above-mentioned adhesive.

Further, the present invention provides an optical laminated film comprises an optical film layer, an adhesive layer consisting of the above-mentioned adhesive and a releasable film layer.

0026

The feature of the present invention resides in the fact that a component capable of functioning as an adhesive without using conventional materials, such as an acrylic resin and a silicone compound, is found. Using the adhesive of the present invention, it becomes possible to maintain a very excellent adhesion property for a long period under the high temperature and high humidity, and also to provide an optical laminate having an excellent durability with regard to the adhesion property between the glass substrate and the optical films, and showing a fewer fluctuation in the optical properties.

[0027]
In the production of the photocured product of the present invention, ultraviolet rays are generally used, however, electron beams and the like may be used to initiate curing.

[0028]
The coating- or film-forming photocurable composition of the present invention is made based on the inventors' attention that diallyl phthalate can form a coating, and simultaneously showing a heat resistance and a transparency. The inventors have found that if a certain sulfur compound is incorporated into the diallyl phthalate, a polymerization product with a three-dimensional structure having an excellent adhesion property is produced by the simple polymerization reaction using light or ultraviolet ray.

That is, the coating-forming photocurable composition of the present invention is characterized by adding a photopolymerization initiator in an amount of 0.005 to 10% by weight to a polymerizing composition which comprises at least one of diallyl phthalate, diallyl isophthalate and diallyl terephthalate, and pentaerythritol tetra(3-mercaptopropionate) in an equivalent ratio of 2:1 to 1:3.

[0029]
The anti-reflective glass with the scattering-preventing function according to the present invention is to solve the above-mentioned problems by using the specific adhesive when a film having the given anti-reflective function is laminated onto the conventional glass.

That is, the anti-reflective glass with the scattering-preventing function according to the present invention is characterized by comprising a glass having applied to at least one surface of an adhesive layer, a plastic film layer and an anti-reflective layer in this order from the one surface. The adhesive layer comprises a photocurable composition which comprises a monomeric mixture of at least one of diallyl phthalate, diallyl isophthalate and diallyl terephthalate, and pentaerythritol tetra(3-mercaptopropionate) in an equivalent ratio of 2:1 to 1:3; and a photopolymerization initiator of 0.005 to 10% by weight being added to the monomeric mixture.

[0030]
The shock-absorbing material according to the present invention is characterized by comprising a sheet-like photocured product of polymerizing composition which comprises a monomeric mixture of at least one of diallyl phthalate, diallyl isophthalate and diallyl terephthalate, and pentaerythritol tetra(3-mercaptopropionate) in an equivalent ratio of 2:1 to 1:3; and a photopolymerization initiator of 0.005 to 10% by weight being added to the monomeric mixture.

The present invention also provides a shock-absorbing material in which a film is laminated onto a single surface of the sheet-like photocured product.

[0031]
The ultraviolet-cutting sheet according to the present invention is completed based on the findings that a photocurable resin having the specific composition can exhibit an excellent flexibility along with an UV cutting effect, can be semi-permanently brought in close contact with a plane surface without using an adhesive agent, and also can be optionally released from the adherend in a simple method.

That is, the ultraviolet-cutting sheet of the present invention is characterized by comprising a photocured product of polymerizing composition which comprises a monomeric mixture of at least one of diallyl phthalate, diallyl isophthalate and diallyl terephthalate, and pentaerythritol tetra(3-mercaptopropionate) in an equivalent ratio of 2:1 to 1:3; and a photopolymerization initiator of 0.005 to 10% by weight being added to the monomeric mixture.

The present invention further provides an ultraviolet-cutting sheet in which an anti-reflective layer is applied on a single surface of the photocured product.

[0032]
The ultraviolet-cutting filter for televisions according to the present invention is completed based on the findings that a photocurable resin having the specific composition can cut UV rays, prevent the generation of electrostatic charges and also exhibit an excellent flexibility, can be semi-permanently brought in close contact with a plane surface without using an adhesive agent, and also can be optionally released from the adherend in a simple method.

That is, the ultraviolet-cutting sheet for televisions according to the present invention is characterized by comprising a photocured product of polymerizing composition which comprises a monomeric mixture of at least one of diallyl phthalate, diallyl isophthalate and diallyl terephthalate, and pentaerythritol tetra(3-mercaptopropionate) in an equivalent ratio of 2:1 to 1:3; and a photopolymerization initiator of 0.005 to 10% by weight being added to the monomeric mixture.

The present invention further provides an ultraviolet-cutting sheet for televisions in which an anti-reflective layer is applied on a surface of the photocured product.

[0033]
The filter for visual display terminals (VDTs) according to the present invention is completed based on the findings that a deposition layer of indium—tin oxide can exhibit an electromagnetic waves-shielding property and an ultraviolet-curable resin having the specific composition can cut UV rays, prevent the generation of electrostatic charges and also exhibit an excellent flexibility, can be semi-permanently brought in close contact with a plane surface without using an adhesive agent, and also can be optionally released from the adherend in a simple method.

That is, the VDT filter according to the present invention is characterized by comprising a substrate film having applied on one surface thereof a deposition layer of indium—tin oxide and on the other surface thereof a flexible resin layer which comprises a photocured product of polymerizing composition, the polymerizing composition comprising a monomeric mixture of at least one of diallyl phthalate, diallyl isophthalate and diallyl terephthalate, and pentaerythritol tetra(3-mercaptopropionate) in an equivalent ratio of 2:1 to 1:3; and a photopolymerization initiator of 0.005 to 10% by weight being added to the monomeric mixture.

Further, the VDT filter of the present invention may have an anti-reflective layer on the deposition layer of indium—tin oxide.

[0034]
The high refractive index primer composition according to the present invention is completed based on the findings that use of the ultraviolet-curable resin enables to form a film or coating within a shortened time, and incorporation of a sol of metallic compound having a high refractive index enables to reduce interference fringes.

That is, the high refractive index primer composition of the present invention comprises 60 to 95% by weight of the photocurable polymerizing composition and 5 to 40% by weight of a sol of metallic compound having a high refractive index.

In addition, the process for the production of primer-coated lenses according to the present invention is characterized by coating the above-mentioned primer composition on a substrate of plastic lens, followed by ultraviolet irradiation, to form a primer layer or coating.

DESCRIPTION OF REFERENCE NUMERALS

Figure 1:
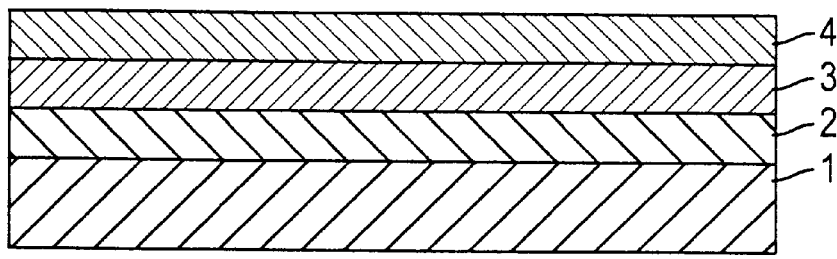
FIG. 1 is a cross-sectional view of the anti-reflective glass with the scattering-preventing function according to the present invention.

| | |
|---|---|
| 1 | glass |
| 2 | adhesive layer |
| 3 | layer of plastic film |
| 4 | anti-reflective layer |
| 11 | substrate film |
| 12 | flexible resin layer |
| 13 | deposition layer of indium-tin oxide |
| 14 | anti-reflective layer |

0035

PREFERRED EMBODIMENTS OF THE INVENTION

The inventors have paid their attention upon the fact that diallyl phthalate can form a coating exhibiting both of a heat resistance and a transparency, and then have found that if a certain sulfur compound is incorporated into diallyl phthalate, it becomes possible to use a simple polymerization reaction, thereby producing a transparent polymerization product having a three-dimensional structure and exhibiting an excellent repeatability of adhesion. Consequently, the inventors have completed the present invention.

Hereinafter, the present invention will be described in detail.

In the polymerizing composition of the present invention, as the monomers, at least one member selected from diallyl phthalate, diallyl isophthalate and diallyl terephthalate as a diallyl component, and pentaerythritol tetra(3-mercaptopropionate) as a functional group-containing component are used in an equivalent ratio of 2:1 to 1:3. If the both monomers are blended in a ratio other than the above-described range of the equivalent ratio, unpolymerized components in the form of liquid are remained in the polymerization product because of incompletion of the polymerization reaction. Further, if the amount of at least one of diallyl phthalate, diallyl isophthalate and diallyl terephthalate as the diallyl component is increased above said range of the equivalent ratio, the polymerization can not be completed. Furthermore, if the amount of pentaerythritol tetra(3-mercaptopropionate) is excessively increased, the resulting polymerization product will give a strong odor of the monomers used.

In view of the polymerization reaction and uniformity of the cured product, it is more preferred that the diallyl component and the functional group-containing component are used in an equivalent ratio of 1.1:1 to 1:1.1.

0036

To the monomeric mixture satisfying the above-mentioned equivalent ratio, a photopolymerization initiator is added for the purpose of causing a polymerization reaction upon lights or ultraviolet rays. It is preferred that the amount of the photopolymerization initiator added is so controlled that it is contained in the polymerizing composition in an amount of 0.005 to 10% by weight. The photopolymerization initiator of less than 0.005% by weight will not ensure a polymerization reaction sufficient for curing, and a adhesion property will be insufficient. The amount of addition above 10% by weight will cause a sudden reaction upon addition of the photopolymerization initiator, thereby losing a stability as a solution. If these drawbacks have happened, they will become a cause of serious troubles in the production plants.

0037

The photopolymerization initiator is not restricted to the specific one, and accordingly a wide variety of photopolymerization initiators may be used in the practice of the present invention. Typical examples of photopolymerization initiators include benzoin, benzyl, benzoin methyl ether, acetophenone, 2-hydroxy-2-methyl-1-phenylpropane-1-one, 1-(4-isopropylphenyl)-2-hydroxy-2-methylpropane-1-one, 4-(2-hydroxyethoxy)phenyl-(2-hydroxy-2-propyl) ketone, 1-hydroxycyclohexyl phenylketone, 2,2-dimethoxy-2-phenylacetophenone, 2-methyl-1-[4-(methylthio)phenyl]-2-morpholino-propane-1-one, 2-benzyl-2-dimethylamino-1-(4-morpholinophenyl)-butane-1-one, benzophenone, 4,4'-bis(dimethylamino)benzophenone, 4,4'-bis(diethylamino) benzophenone, N,N-dimethylamino acetophenone, 2-methylanthraquinone, 2-ethylanthraquinone, 1-chloroanthraquinone, 2,4-diethylthioxanthone, 2,4-diisopropylthioxanthone, 2,4,6-trichloromethyl-s-triazine, 2-(p-chlorophenyl)-4,6-bis(trichloromethyl)-s-triazine, 2-(p-tolyl)-4,6-bis(trichloromethyl)-s-triazine, 2,4-bis(trichloromethyl)-4'-methoxyphenyl-s-triazine, 2-(4-methoxynaphtho-1-yl)-4,6-bis(trichloromethyl)-s-triazine, 2-p-methoxystyryl-4,6-bis(trichloromethyl)-s-triazine, 2-(2',4'-dimethoxystyryl)-4,6-bis(trichloromethyl)-s-triazine, 2,2'-bis(o-chlorophenyl)-4,4',5,5'-tetraphenylbisimidazolyl, 2,2'-bis(o-chlorophenyl)-4,4',5,5'-tetra(p-methoxyphenyl)bisimidazolyl, 2,4,6-trimethylbenzoyldiphenylphosphine oxide, bisacylphosphine oxide, triphenylphosphine, triphenylphosphite, trilauryl-trithiophosphite, bis(2,6-dimethoxybenzoyl)-2,4,4-trimethylpentylphosphine oxide, (η5~2,4-cyclopentadiene-1-yl)[(1,2,3,4,5,6-η)-(1-methylethyl)benzene]-iron(1+)-hexafluorophosphite(1−) and the like. These photopolymerization initiators may be used alone or as a combination of two or more.

Among the above-listed photopolymerization initiators, it is particularly preferred to use 2-hydroxy-2-methyl-1-phenylpropane-1-one and bisacylphosphine oxide in combination.

Further, these photopolymerization initiators may be used in combination with any one or two or more of the well-known photosensitizing agents such as N,N-dimethylaminobenzoic acid ethyl ester, N,N-dimethylaminobenzoic acid isoamyl ester, triethanol amine, 2-mercaptobenzothiazole, 2-mercapto benzooxazole, 2-mercapto benzoimidazole, 2-mercapto-5-methylthio-1,3,4-thiazole and the like.

[0038]

For the present invention, the polymerizing composition may be used after dilution with a solvent for the purpose of increasing its coatability and for the purposes of controlling its viscosity and uniformly mixing the components. The organic solvent which can be used herein is not restricted to the specific one, and in view of obtaining a coating composition having a good coatability, it includes organic solvents, for example, 3-methyl-3-methoxybutanol, propylene glycol monomethyl ether, dipropylene glycol monomethyl ether, tripropylene glycol monomethyl ether, ethyl cellosolve, methyl cellosolve, methyl carbitol, ethyl carbitol and the like.

In addition, the organic solvent includes a hydrocarbon solvent such as n-hexane, n-decane, cyclohexane and the like, an aromatic hydrocarbon solvent such as benzene, toluene, xylene and the like, an ester solvent such as butyl acetate, benzyl acetate and the like, an alcoholic solvent such as methyl cellosolve, ethyl cellosolve, butyl cellosolve, methyl carbitol, ethyl carbitol, butyl carbitol, methyl cellosolve acetate, ethylene glycol, diethylene glycol and the like, a ketone solvent such as methyl ethyl ketone, and derivatives thereof.

[0039]

In practice of the present invention, in addition to the above-described polymerizing composition (monomeric mixture) and photopolymerization initiator as the essential components, any additive such as a stabilizer or stabilizing agent, a curing accelerator, a defoaming agent, a leveling agent, a surface active agent, an ultraviolet (UV)-absorbing agent, pigments and the like may be used, if necessary.

[0040]

In the present invention, to the monomeric mixture having the described equivalent ratio, an UV-absorbing agent may be added in an amount of 0.01 to 3.0% by weight, if necessary. If the amount of the UV-absorbing agent added is less than 0.01% by weight, a satisfactory UV-absorbing effect can not be obtained, and the UV-absorbing agent beyond 3.0% by weight results in saturation thereof, thereby not dissolving in the monomeric mixture.

The UV-absorbing agent is not restricted to the specific one, insofar as it can be dissolved in either or both of the above-mentioned monomers, and accordingly a wide variety of UV-absorbing agents may be used. Usable UV-absorbing agents include, for example, benzophenones such as 2-hydroxybenzophenone, 2,4-dihydroxybenzophenone and the like, salicylates such as phenylsalicylate and the like, benzotriazoles such as (2'-hydroxyphenyl)benzotriazole, (2'-hydroxy-5'-methylphenyl)benzotriazole, 2,2-methylene-bis[4-(1,1,3,3-tetramethylbutyl)-6-(2H-benzotriazole-2-yl)phenol] and the like, and cyanoacrylates such as ethyl-2-cyano-3,3-diphenylacrylate and the like. These UV-absorbing agents may be used alone or as a combination of two or more agents.

[0041]

The coating-forming\UV-curable composition of the present invention is constituted from the monomeric mixture described in the paragraph number [0035] and the photopolymerization initiator described in the paragraph number [0036]. The composition of the present invention has an excellent coatability and storage stability, and can be cured or hardened upon irradiation of UV rays after it is coated on the substrate and others. The thus-produced cured coating has both of a heat resistance and a transparency, is excellent in an adhesion property, and also is excellent in electrical properties, particularly an insulating property, and therefore the cured coating can be utilized as an insulating layer for semiconductor-mounted devices, a passivation layer, a buffer layer, an insulating interlayer for the multilayered printed circuits or the semiconductor integrated circuits, and a protective coating of the waveguide materials and the phase shifting materials.

Further, when the cured coating is used as a protective coating of the color filters, a transparent protective coating can be produced by coating a polymerizing composition of the present invention over a coloring layer on the transparent substrate such as glass and the like and, if necessary, over a light-shielding layer provided in a gap between the coloring layers, and by curing the coated composition.

[0042]

The anti-reflective glass with the scattering-preventing function will be described with reference to the accompanying drawing.

FIG. 1 is a cross-sectional view of the anti-reflective glass with the scattering-preventing function according to the present invention. The anti-reflective glass with the scattering-preventing function using the adhesive resin of the present invention has, on a single surface or both surfaces of the glass 1, an adhesive layer 2, a plastic film layer 3 and an anti-reflective layer 4 in this order.

The glass used in the present invention is completely free from restrictions with regard to its configuration, properties of the material and others.

[0043]

In the present invention, a photocurable composition comprising the monomeric mixture described in the paragraph number [0035] having added thereto the photopolymerization initiator described in the paragraph number [0036]. A thickness of the adhesive layer 2 is generally in the range of 1 to 100 μm, preferably 10 to 90 μm. The thickness of the adhesive layer of less than 1 μm can not exhibit a satisfactory adhesion power, and the thickness above 100 μm can deteriorate a smoothness of the adhesive layer.

[0044]

Further, films of, for example, polyesters such as polyethylene terephthalate, polybutylene terephthalate, polyethylene naphthalate, polyethylene terephthalate-isophthalate copolymers and the like, polyacrylates, polyurethanes, polyolefines such as trimethylpentene and the like, polyamides, polycarbonates, acetyl celluloses such as triacetyl cellulose, diacetyl cellulose, acetate butylate cellulose and the like, polyether sulfons, polysulfons, polyethers, polyether ketones, poly(meta)acrylonitrile and others may be used as the plastic film layer 3. These films are generally used as a colorless and transparent film, however, depending upon the fields of utilization of the scattering-preventing antireflective glass, they may be colored or they may contain the designs or patterns.

Furthermore, a thickness of the plastic film layer 3 is generally in the range of 10 to 500 μm, preferably 50 to 450 μm. The thickness of less than 10 μm causes a difficulty in obtaining a smoothness necessary as the scattering-preventing antireflective glass, and the thickness above 500 μm can deteriorate a flexibility (pliability, ease of bending), thereby causing a difficulty of handling (operation).

[0045]

For the antireflective glass with the scattering-preventing function formed according to the present invention, an antireflective layer 4 is applied over the plastic film layer 3, namely, as an outermost layer. The anti-reflective layer is not particularly limited, and, for example, it can be formed from one or two or more inorganic materials such as titanium oxide, magnesium fluoride, aluminum oxide, silicon oxide, tantalum oxide, diantimony pentaoxide, indium oxide, yttrium oxide, ytterubium oxide, zirconium oxide, cerium fluoride, cerium oxide, lanthanum fluoride, lanthanum oxide, stannic oxide and the like by depositing these materials or alternatively from organic materials such as fluorine-containing compounds, silane compounds and the like by applying these materials as a thin layer which, as applied, can be used as the antireflective layer or by curing these materials with electron beams, ultraviolet rays, heat or the like. The antireflective layer may be formed either as a single layer or as a multilayer from the above-mentioned materials, and it is preferred that its thickness is so designed that the thickness equals to a wavelength of visible radiations or a half or less of said wavelength, although the thickness may be varied depending upon the used glass and layer constitutions.

0046

For the production of the antireflective glass with the scattering-preventing function formed according to the present invention, a plastic film with the previously applied antireflective layer may be prepared, and after by adhering the plastic film to the glass, or alternatively, after adhesion of a film onto the glass, an antireflective layer may be formed over the film. In each case, an outermost layer must always be an antireflective layer.

As an means for adhesion of the glass and the plastic film, there are a method in which an adhesive agent consisting of an adhesive resin according to the present invention is coated on a surface of the glass, a plastic film is applied over the coated adhesive agent, and then the adhesive agent is photocured, and a method in which a plastic film with the coated adhesive agent consisting of an adhesive resin is applied onto a surface of the glass, and then the adhesive agent is photocured.

The thus-produced glass according to the present invention has a function of preventing the broken glass from scattering, and thus ensures safety of the human body and others, because the broken glass can be kept on the plastic film due to a high adhesion property of the cured adhesive agent to both the glass and the plastic film, when the glass is broken due to an accidental trouble and the like.

0047

The adhesive agent according to the present invention may be used for the adhesion of optical films having optical properties such as a polarizing film and other films. The adhesive agent comprises the monomeric mixture described in the paragraph number [0035]. For the purpose of inducing a photopolymerization and curing reaction, the photopolymerization initiator described in the paragraph number [0036] is incorporated in the adhesive agent.

0048

The adhesive agent of the present invention is obtained by blending each of the above-described components in a dark room to prepare a polymerizing composition, and the resulting composition is irradiated with light to cause a polymerization and curing reaction of the adhesive, thereby producing a photocured product. Typically, the resultant polymerizing composition is subjected to light irradiation, after it is molded into a film, a sheet and other configurations depending upon the specific use of the adhesive agent.

0049

The method of forming and curing the polymerizing composition to obtain a photocured product is not restricted to the specific one, and it includes, for example, a method of coating a solution of the polymerizing composition at a predetermined thickness on a substrate, followed by light irradiation, a method of pouring a solution of the polymerizing composition into a predetermined mold, followed by light irradiation, and other methods.

0050

Typically, ultraviolet rays are used as the irradiation light, but electron beams may be used, as an alternataive. The conditions of the light irradiation are not restrictive, and therefore those conventionally used in the well-known prior art methods may be adopted.

0051

The adhesive agent of the present invention may be used in the adhesion of optical films having optical properties such as a polarizing film and the like. For example, the adhesive agent can be conveniently used in the adhesion between an optical film and a substrate such as a glass plate and the like.

0052

The optical laminated plate formed by using an adhesive agent consisting of a cured product of the polymerizing composition is a laminate or laminated product produced by laminating a substrate and an optical film layer through an adhesive layer consisting of the adhesive agent of the present invention.

0053

An optical film for constituting the optical film layer is not restricted to the specific one, insofar as the selected film has optical properties, but preferably polymeric films such as a polarizing film, a phase difference film, an elliptic polarizing film and the like are used as the optical film. A thickness of the optical film is not restrictive, and it is preferred that each film has a thickness of about 25 to 250 μm.

0054

The polarizing film includes polarizing films using polyvinyl alcohol, polarizing films using polyvinyl formal, polarizing films using polyvinyl acetal and others.

Preferably, the biaxially oriented films (degree of orientation: 2 to 10 times, preferably 4 to 7 times) produced from a raw film consisting of a polyvinyl alcohol resin having an average polymerization degree of 1500 to 10000 and a saponification degree of 85 to 100% by mole by dyeing the film with an aqueous solution of iodine—potassium iodide or a dichromic dye are used as the polarizing film.

0055

As the phase difference film, polymeric films such as those of polyvinyl alcohols, polycarbonates, polyesters, polyallylates, polyimides, polyolefines, polystylenes, polysulfons, polyether sulfons, triacetyl cellulose resins, cyclic polyolefines, cellulose acetate, polyvinyl chloride, saponification products of ethylene-vinyl acetate copolymer and the like are used. Principally, polycarbonate or polyvinyl alcohol films are used.

0056

The elliptic polarizing film is a combination of a polarizing film and a phase difference film. These films may be used after one type or two or more types of the films are laminated.

0057

The substrate used herein is not restricted to the specific one, and it includes a metal plate such as a stainless steel plate, aluminum plate, steel plate and the like, a decorative plate or laminate of the synthetic resin such as a polyethylene plate, polypropylene plate, melamine resin plate, phenol resin plate and the like, a plate-shaped material such as a plywood, wood veneer, glass plate and the like, a rod-shaped material, a cut and polished article, an injection molded article, a protective material and others.

Among the above-described materials, the effects of the present invention will be remarkably exhibited, when the glass plate is particularly used as the substrate. A thickness of the substrate is not restrictive, and it is preferably in the range of about 1 to 100 mm.

[0058]

The method for producing the optical laminated plate is not restrictive. For example, the optical laminated plate can be obtained by applying a layer consisting of the adhesive agent of the present invention onto an optical film which will be described hereinafter, and further applying a release film layer onto the applied adhesive layer, thereby forming an optical laminated film. Before use, the optical laminated film is suitably cut, and the cut laminated film is adhered to the substrate after the release film is removed therefrom. Alternatively, the production method of the optical laminated plate includes a method in which an adhesive layer consisting of the adhesive agent of the present invention is formed by coating the above-described polymerizing composition onto a substrate and then irradiating the coating with lights such as ultraviolet rays and the like, and then an optical film is pressed and laminated to an adhesive layer side of the substrate by means of rollers and the like.

[0059]

The laminated plate produced by using the adhesive agent of the present invention, if the above-described adhesive agent based on the transparent resin of the present invention is used, can ensure an optical laminated plate which does not generate any defects in appearance such as foaming or peeling of the adhesive layer during its use at a high temperature and a high humidity, exhibits an excellent heat resistance and humidity resistance, and also has excellent optical properties such as radiation permeability and the like. Such optical laminated plate can be used as a liquid crystal display device, sunglasses, daze-free or glare-proofing glasses and the like.

[0060]

When the laminated plate produced according to the present invention is used as a liquid crystal display device, the optical laminated plate can be applied to the liquid crystal display device, after it is prepared by laminating a liquid crystal cell and a polarizer (polarizing film) by using the adhesive agent of the present invention. The liquid crystal cell has a structure in which a liquid crystal is sandwiched between two glass substrates, each of which has a transparent electrode coated on a surface of the substrate, and a molecular orientation layer formed on the electrode.

[0061]

The optical laminated film of the present invention is a laminated film having an optical film layer and an adhesive layer.

The optical laminated film of the present invention is obtained by using optical films such as the above-described polarizing film, phase difference film, elliptic polarizing film and the like as a base or substrate and laminating an adhesive layer constituted from the adhesive agent, consisting of the adhesive resin, of the present invention. The means for applying the adhesive layer includes, for example, a method in which the above-described polymerizing composition of the present invention is coated on the base, and thereafter the coated composition is irradiated with lights to obtain a photocured product.

[0062]

The optical laminated film of the present invention can be cut to obtain a configuration required for use, thereby forming an optical laminated plate. The cut film is adhered through its adhesive layer to a glass or other substrates described above as an adherend.

[0063]

In addition, if required, a layer of the release film or the like may be further applied over the adhesive layer of the laminated film (a side opposed to the optical film layer). The application of the release film layer enables to obtain an optical laminated film having an excellent convenience, because the optical laminated film can be adhered to a substrate such as glass and the like, after it is cut to a required configuration and then the release film layer is suitably separated from the cut film. The material for forming the release film layer includes polyesters such as polyethylene terephthalate, polyethylene naphthalate and the like, polyolefines such as polyethylene, polypropylene and the like, polyvinyl halides such as polyvinyl chloride, polyvinylidene chloride and the like, and others.

[0064]

The method of forming an adhesive layer and a release film layer on the substrate includes a method in which an adhesive layer is applied on a release film and then an optical film is laminated on the applied adhesive layer, a reverse method in which an optical film is used as a substrate, an adhesive layer is applied on the film substrate and then a release film is laminated on the applied adhesive layer, and others. The thus obtained optical laminated film can be laminated to glass or other substrates as the adherend, after the laminated film is cut to a required shape before use, and the release film is peeled from the same.

[0065]

The shock-absorbing material according to the present invention comprises a sheet-like ultraviolet (UV)-cured product of the polymerizing composition which comprises the monomeric mixture described in the paragraph number [0035] having added thereto the photopolymerization initiator described in the paragraph number [0036].

Further, for the present invention, if necessary, a stabilizer or stabilizing agent may be added in an amount of 0.01 to 3.0% by weight to the monomeric mixture having the above-described equivalent ratio. The amount of the stabilizing agent added of less than 0.01% by weight does not ensure a light stability of the mixed solution, and the amount of above 3.0% by weight causes a difficulty of dissolution of the added agent.

The stabilizing agent is not restrictive, insofar as it can be dissolved in either or both of the monomers used. A variety of the stabilizing agents may be used, and include, for example, the UV-absorbing agent described in the paragraph number [0040]. These stabilizing agents may be used alone or by combining two or more agents.

[0066]

The sheet-like cured product based on the adhesive resin, which is obtained by irradiating the above-described polymerizing composition with ultraviolet rays, and by molding into a sheet-like product, has a high transparency and an excellent flexibility. A thickness of the sheet-like UV-cured product may be widely varied depending upon types of the articles to be protected and objects in use of the shock-absorbing material (transport, keeping and the like), and typically the thickness is preferably in the range of 0.01 to 5 mm, more preferably in the range of 0.05 to 3 mm. The thickness of the sheet-like UV-cured product of less than 0.01 mm does not ensure a satisfactory shock-absorbing effect, and the thickness of above 5 mm may reduce a workability.

[0067]

The shock-absorbing material of the present invention may be those obtained by laminating a film on a single surface of the sheet-like UV-cured product. The lamination of the film on the single surface of the UV-cured product makes easy to peel off one sheet from others at a film surface when a package is opened, after sheets of glass are laminated and packed to make the package, because the UV-cured product used in the present invention has a property of closely fixing to glass. The film is not restricted to the specific one and includes films of polyesters such as polyethylene terephthalate and the like, films of polyolefines such as polyethylene, polypropylene and the like, films of polyvinylidene chloride and the like, and other films.

The film typically has a thickness of 10 to 400 µm, preferably 20 to 200 µm. The film thickness of less than 10 µm results in a reduction of the strength, and the thickness of above 400 µm does not ensure winding of the film during production.

The shock-absorbing material having the above-described laminate structure can be produced by coating on a film a polymerizing composition prepared by blending each of the above-described components, and causing a polymerization and curing reaction of the composition upon UV irradiation, thereby forming a layer consisting of the UV-cured product having an excellent flexibility.
0068

The UV-cutting sheets according to the present invention are those produced by mixing the monomeric mixture described in the paragraph number [0035] with the UV-absorbing agent described in the paragraph number [0040] and the photopolymerization initiator described in the paragraph number [0036].

Upon UV irradiation to the polymerizing composition containing each of the above-described components as described above, thereby causing a polymerization and curing reaction of said composition, there is obtained an UV-cured resin having a high transparency. Moreover, the thus obtained UV-cured resin has an excellent flexibility and a sheet-like molded article thereof can be adhered to a glass surface or a display surface of the televisions without using an adhesive and other aids. The adhesion of the molded article can be semi-permanent. Further, the adhered article can be easily separated by hand, and also the adhesion and separation of the article can be repeated again and again.

Molding of the UV-cured resin can be carried out by using any well-known methods, for example, extrusion molding method and calendaring method such as die method, inflation method, coextrusion method, extrusion lamination method and the like, for example, roll coating method, spraying method and the like.

Typically, in view of ease of handling and adhesion property, the UV-cutting sheets and UV-cutting filters for televisions formed from the above-described UV-cured product preferably have a thickness of 0.01 to 2 mm, more preferably a thickness of 0.1 to 1 mm.
0069

An antireflective layer may be further applied to the UV-cutting sheets of the present invention. The material for forming the antireflective layer includes ZnO, TiO2, CeO2, Sb2O5, SnO2, ZrO2, Al2O3, and low-refractive index materials such as MgF2, SiOx (1.50≦x≦2.00), LiF, 3NaF—AlF3, AlF3, Na3AlF6 and the like. The antireflective layer can be formed by any optional method such as vacuum deposition method, sputtering method, ion plating method, ion beam assisted method and the like.

For the present invention, it is preferred that a thickness of the antireflective layer is so designed that a layer portion using the high-refractive index materials has a thickness of λ/2 and a layer portion using the low-refractive index materials has a thickness of λ/4, in which λ means 550 nm.
0070

The UV-cutting television filters of the present invention are produced by mixing the monomeric mixture described in the paragraph number [0035] with the UV-absorbing agent described in the paragraph number [0040] and also the photopolymerization initiator described in the paragraph number [0036].

Upon UV irradiation to the polymerizing composition containing each of the above-described components incorporated as described above, thereby causing a polymerization and curing reaction of said composition, there is obtained an UV-cured resin having a high transparency. Moreover, the UV-cured resin has an excellent flexibility and a sheet-like molded article thereof can be adhered to a display surface of the televisions without using an adhesive and the like. The adhesion of the molded article can be semi-permanent. Further, the adhered article can be easily separated by hand, and also the adhesion and separation of the article can be repeated again and again.

Molding of the UV-cured product can be carried out by using any well-known method such as roll coating method, spraying method and others.

In view of ease of handling and adhesion property, it is generally preferred that the UV-cutting television filters made from the above-described UV-cured product have a thickness of 0.01 to 2 mm, more preferably a thickness of 0.1 to 1 mm.
0071

Further, the UV-cutting television filters of the present invention, although they do not use an anti-static agent, can inhibit generation of electrostatic charges, and therefore they can prevent undesirable adhesion of trashes and dusts to the filters and electric shock due to the generated electrostatic charges.
0072

For the UV-cutting television filters of the present invention, an antireflective layer may be further applied thereto. The material for forming the antireflective layer includes high-refractive index materials, for example, ZnO, TiO2, CeO2, Sb2O5, SnO2, ZrO2, Al2O3 and the like, and low-refractive index materials, for example, MgF2, SiOx (1.50 ≦x≦2.00), LiF, 3NaF—AlF3, AlF3, Na3AlF6 and the like. The antireflective layer can be formed in accordance with any optional method such as vacuum deposition method, sputtering method, ion plating method, ion beam assisted method and the like.

In the practice of the present invention, it is preferred that a thickness of the antireflective layer is so designed that a layer portion using the high-refractive index materials has a thickness of λ/2 and a layer portion using the low-refractive index materials has a thickness of λ/4, in which λ means 550 nm.
0073

The filters for visual display terminals (VDTs) of the present invention, as described in the above, have a deposition layer of indium—tin oxide (ITO) on one surface of the substrate film, and a flexible resin layer, formed from the specified UV-cured product, on another surface of the substrate film.

The substrate film used herein is not limited to the specific one, if it is a transparent film, and it includes polyester films such as polymethyl methacrylate films, polycarbonate films, polyethylene terephthalate films and the like; polyolefin films such as polyethylene films, polypropylene films and the like; cellulose films such as nitrocellulose films, acetylcellulose films, cellulose acetate propionate films, ethylhydroxy ethylcellulose films and the like; polyvinylidene chloride films; polyvinyl chloride films; polystyrene films and others.

Typically, the substrate film has a thickness of 10 to 400 µm, preferably 25 to 200 µm. When the substrate film has a thickness of less than 10 μm, the mechanical strength is reduced. The film thickness above 400 μm causes a problem that the film can not be wound during the production process.

0074

In the filters of the present invention, a deposition layer of ITO applied to one surface of the substrate film has a function of shielding electromagnetic waves, and its layer thickness is preferably in the range of 50 to 600 Å, more preferably in the range of 75 to 300 Å. The layer thickness of less than 50 Å loses its electromagnetic waves-shielding effect, and the layer thickness above 600 Å is liable to make cracks.

Note that the ITO layer is a kind of transparent conducting layers. Practically, the ITO layer can be obtained by depositing $In_2O_3$, while adding $SnO_2$ as an impurity during deposition of said $In_2O_3$. The ITO layer has characteristics such as low specific resistance, high transmittance of visible radiations and the like. The methods for forming the ITO layer can be divided into a chemical layer-forming method such as spraying method, coating method, chemical vapor deposition (CVD) method and the like, and a physical layer-forming method such as vacuum deposition method, sputtering method and the like. Recently, the ITO layer has been widely used particularly in liquid crystal display devices.

0075

Further, the flexible resin layer applied to another surface of the substrate film is constituted from the UV-cured product of the polymerizing composition produced by mixing the monomeric mixture described in the paragraph number [0035] with the UV-absorbing agent described in the paragraph number [0040] and also the photopolymerization initiator described in the paragraph number [0036].

0076

In the production of the VDT filters according to the present invention, the polymerizing composition containing each of the above-described components is coated on a surface of the substrate film opposite to the ITO layer which has been deposited on one surface of the substrate film, and by irradiation of UV rays to initiate a polymerization and curing reaction of said composition, thereby producing a layer consisting of the UV-cured product having a high transparency and an excellent flexibility. It is preferred that the flexible resin layer is formed at a thickness of 80 μm to 1 mm, more preferably at a thickness of 125 to 500 μm. The thickness of the flexible resin layer of less than 80 μm exhibits a poor strength during mounting of the filters, and the thickness above 1 mm causes reduction of the adhesion property of the substrate film.

0077

The thus obtained VDT filters of the present invention in which one surface of the substrate film has a deposited ITO layer and another surface thereof has a flexible resin layer consisting of the UV-cured product can exhibit an excellent electromagnetic waves-shielding effect owing to presence of the deposited ITO layer. Further, since its flexible resin layer can be adhered to the CRT surface by not using an adhesive, can be semi-permanently fixed, and also can be easily separated by hand, the filters of the present invention can be repeatedly fixed and separated in any number of times.

Further, the VDT filters of the present invention, although they do not use an anti-static agent, can inhibit generation of electrostatic charges, thereby preventing adhesion of trashes and dusts to the filters and electric shock due to the generated electrostatic charges.

0078

For the VDT filters of the present invention, an antireflective layer may be further applied over the deposited ITO layer thereof. The material for forming the antireflective layer includes high-refractive index materials, for example, $ZnO$, $TiO_2$, $CeO_2$, $Sb_2O_5$, $SnO_2$, $ZrO_2$, $Al_2O_3$ and the like, and low-refractive index materials, for example, $MgF_2$, $SiOx$ ($1.50 \leq x \leq 2.00$), $LiF$, $3NaF$—$AlF_3$, $AlF_3$, $Na_3AlF_6$ and the like. The antireflective layer can be formed in accordance with any optional method such as vacuum deposition method, sputtering method, ion plating method, ion beam assisted method and the like.

In the practice of the present invention, it is preferred that a thickness of the antireflective layer is so designed that a layer portion using the high-refractive index materials has a thickness of $\lambda/2$ and a layer portion using the low-refractive index materials has a thickness of $\lambda/4$, in which $\lambda$ means 550 nm.

0079

Next, the VDT filters of the present invention will be described with reference to the accompanying drawing.

Figure 2:
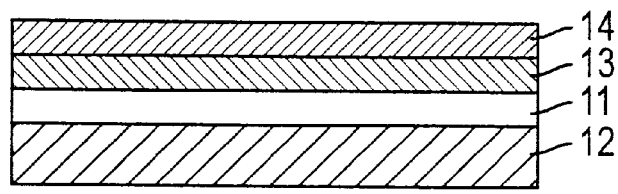
FIG. 2 is a cross-sectional view of the filter for VDTs illustrating one preferred embodiment of the present invention.

FIG. 2 is a cross-sectional view of the VDT filter illustrating one preferred embodiment of the present invention. The illustrated VDT filter has a deposited layer 13 of the indium—tin oxide (ITO) on one surface of a substrate film 11 and a flexible resin layer 12 consisting of the above-described UV-cured product on another surface of the substrate film 11. The VDT filter further has an antireflective layer 14 on the deposited ITO layer 13.

0080

The high refractive index primer composition and the primer-coated lenses using the same according to the present invention are those containing the photopolymerization initiator described in the paragraph number [0036] in the monomeric mixture described in the paragraph number [0035]. In particular, a photocurable polymerizing composition obtained by mixing said components in a dark room is preferred, because the composition can improve a shock resistance of the resulting product.

The high refractive index primer composition comprises 60 to 95% by weight of the photocurable polymerizing composition prepared as described above and 5 to 40% by weight of a sol of metallic compound having a high refractive index. Further, a photopolymerization initiator in an amount of 0.005 to 10% by weight based on the total weight of the composition is added to the composition. More preferably, the photopolymerization initiator is added in an amount of 0.01 to 2.0% by weight.

0081

Further, the primer composition of the present invention can be prepared so that it contains a sol of metallic compound having a high refractive index, thereby removing interference fringes generated between the lens substrate and the hard coated layer. The sol of metallic compound having a high refractive index is preferably a sol of organic solvent dispersion type containing a compound of at least one metal selected from the group consisting of Fe, Al, Ti, Zr, Sn and Sb. More particularly, the metallic compound includes oxides or complex oxides of the metal selected from the group consisting of Fe, Al, Ti, Zr, Sn and Sb, or metal oxides containing a minor amount of one of the above-described metals. The organic solvent includes, for example, methanol, isopropyl alcohol, methyl cellosolve, ethyl cellosolve and the like.

0082

For the primer composition of the present invention, it is preferred that the above-described sol of metallic compound having a high refractive index is contained in an amount of 5 to 40% by weight, more preferably, in an amount of 13 to 38% by weight. The content of the sol of metallic compound of less than 5% by weight results in reduction of the refractive index, and the content above 40% by weight is liable to produce cracks.

The ratio in incorporation of the sol of metallic compound having a high refractive index and the polymerizing composition is preferably in the range of 1:1.5 to 1:19 with regard to the mixing ratio (weight ratio) of the sol and the resin, most preferably in the range of 1:2.33 to 1:9. An excessive increase of the sol results in liability of producing cracks, and an excessive increase of the resin results in reduction of the refractive index.

Further, other additives such as a leveling agent for improving a coatability, for improving a weathering resistance an UV-absorbing agent, an antioxidation agent and the like, may be added to the primer composition.

0083

In addition, the primer-coated lenses of the present invention can be produced by coating the above-described primer composition on a surface of the substrate of any well-known plastic lenses, and by ultraviolet irradiation. The coating method is not restrictive, and dip coating, roller coating, spray coating, flow coating, spin coating and the like can be easily applied as the coating method. After coating of the primer composition on the lens, UV rays may be irradiated in order to cause a polymerization and curing reaction of the polymerizing composition. Thus, a primer layer having an excellent adhesion property or fixability can be formed on the substrate of the plastic lenses.

The layer thickness required for the primer layer is generally in the range of 0.01 to 2.0 μm, preferably in the range of 0.05 to 0.5 μm. The thickness of less than 0.01 μm does not result in any effects as the primer, and the thickness above 2.0 μm results in liability of producing cracks.

0084

The obtained primer layer has a shock-absorbing property and in addition to this, it can improve an adhesion property of the hard coated layer and diminish an interference fringe generated between the lens substrate and the hard coated layer. Further, the primer layer has a high transparency and does not damage an appearance of the resulting lens.

Any well-known hard coated layer and antireflective layer may be formed on the primer layer.

0085

Effects of the Invention

According to the present invention, it becomes possible to obtain an adhesive transparent resin, which is suitable in a coating for electronic materials, a glass having both of the scattering-preventing function and the antireflective function, an adhesive agent, a shock-absorbing material, an ultraviolet-cutting sheet, an ultraviolet-cutting sheet for televisions, a filter for VDTs and a high refractive index primer composition as well as the methods for the production of primer-coated lenses using said primer composition, is excellent in a coatability, adhesive property, storage stability, durability, shock resistance and the like, and is particularly excellent in a transparency and adhesion property after curing of the same.

0086

The UV-curable composition of the present invention is excellent in a coatability, storage stability and the like, and the coated layer or coating has both of a heat resistance and a transparency and is excellent in an adhesion property and the like and further in electronic properties, particularly insulating property. The coating is suitable in the formation of surface protective and insulating coatings or layers for various electronic materials such as a surface protective coating of semiconductors, an insulating layer of semiconductor-mounted devices, a surface protective coating of color filters of the liquid crystal display devices, an insulating interlayer of multilayered printed circuits, a protective coating of light guiding materials or phase shifting materials and other coatings.

0087

The antireflective glass with the scattering-preventing function of the present invention, since it simultaneously has the antireflective function and the scattering-preventing function, can give a high transmittance to the parts of display devices, construction materials, lenses, automotive parts, furniture and others, to which parts the glass has been applied conventionally, while retaining a safety to the human body.

0088

The shock-absorbing material of the present invention can be effectively used in the transportation or storage of fragile articles such as plate glass, glass articles, potteries and others because the shock-absorbing material has excellent shock-absorbing property and flexibility. For example, in the transportation of plate glass, the shock-absorbing material can be used in place of the conventional wood frames, and can be sandwiched between and in close contact with each plate glass to make stacked plates of glass. Further, the shock-absorbing material has a light weight and also is not bulky, and it can be cut out by scissors and the like into a required dimension. In the prior art methods using the wood frames, it is required to accept a packing volume of two times or more higher than the volume of the plate glass, whereas when the shock-absorbing material of the present invention is alternately stacked with the plate glass, the packing volume can be reduced to about 1.3 times of the volume of the plate glass, that is, the packing volume can be remarkably reduced in comparison with the prior art methods. Further, since an adhesive agent, nails and other means are not used in the packing, the shock-absorbing material can be easily removed from the packed product. Furthermore, in the production of the plate glass, if the shock-absorbing material of the present invention is inserted between the produced plate glass and a plurality of the plate glass are stored under the stacked conditions, it becomes possible to omit the work of transferring the stacked plate glass onto other packing materials such as wood frames for the packing purpose, remarkably shorten the time necessary to pack the plate glass and also eliminate any troublesome matter such as careful and cautious handlings.

In addition, the shock-absorbing material of the present invention can be produced in a simpler method and at cheaper costs in comparison with the prior art sheets having rugged surfaces, and is useful in the storage or transportation of glass articles or potteries, particularly dishes and the like.

0089

The UV-cutting sheets of the present invention exhibit a high transmittance of visible light and have a high transparency. In addition, since the UV-cutting sheets can effectively cut off UV rays, it becomes possible to protect the eyes and skin from harmful UV rays. Further, the UV-cutting sheets do not cause a change in color of furniture and interior articles in the room, and can prevent commercial products from change in color and qualities. Further, they have an excellent flexibility, and can be directly adhered to glass windows and the like. They can be adhered to such adherend while retaining their semipermanent fixation, and, if necessary, they can be easily separated from the adherend by peeling off the same by hand without resulting in stain or damage on the glass surface. The sheets can be cleaned with water ishing, and can be repeatedly used many times. Further, since they do not contain a dye, the sheets have an excellent lightfastness, and therefore can retain their UV-cutting effect for a long period of time.

Accordingly, the UV-cutting sheets can be advantageously applied to a glass surface of a wide variety of constructions, vending machines, ocean constructions, traffic systems and the like.
0090

The UV-cutting filters for televisions according to the present invention exhibit a high transmittance of visible light and have a high transparency. In addition, since the UV-cutting filters can effectively cut off UV rays, it becomes possible to protect the eyes from harmful UV rays. Moreover, since the filters can prevent the generation of electrostatic charges without using any anti-static agent, it ensures to prevent the adhesion of trashes and dusts onto the filters and also prevent receiving any electric shock by the electrostatic charges. Further, the filters can be produced in a very easy method, and also they can be easily mounted onto a surface of the televisions by directly adhering the same to a picture area of said surface (without using an adhesive agent and the like), while retaining their semi-permanent fixation. Furthermore, the filters can be easily separated from the televisions by hand, and such operation of fixation and separation can be repeatedly carried out many times without causing stain formation or damage of the picture area of the filters. The separated filters can be easily washed with water. Furthermore, the filters provided also with the antireflective layer can inhibit color shading, and also they can exhibit an excellent daze-preventing effect.
0091

The VDT filters according to the present invention exhibit a high transmittance of visible light and have a high transparency. In addition, the VDT filters exhibit an excellent electromagnetic waves-shielding effect, and thus can remove any adverse influences onto the human body and can remarkably remove a hazard to health. Further, since the VDT filters can effectively cut off UV rays, it becomes possible to protect the eyes from harmful UV rays. Moreover, since the VDT filters can prevent the generation of electrostatic charges without using any anti-static agent, it ensures to prevent the adhesion of trashes and dusts onto the filters and also prevent receiving any electric shock by the electrostatic charges. Further, the VDT filters can be produced in a very easy method, and also they can be easily mounted onto a surface of the CRTs by directly adhering their flexible resin side to said surface (without using an adhesive agent and the like), while ensuring their semipermanent fixation. Furthermore, the adhered VDT filters can be easily separated from the CRT surface by hand, and such operation of fixation and separation can be repeatedly carried out many times without causing stain formation or damage of the CRT surface. The separated filters can be easily washed with water. Furthermore, the VDT filters provided also with the antireflective layer can prevent reflective projection of fluorescent lamps and lighting windows to the CRT surface, and also they can exhibit an excellent daze-preventing effect.
0092

Since it is photocurable, the primer composition of the present invention can be cured within the curing time of several minutes. Further, it can provide lenses having a high transparency and increased shock resistance which can diminish an interference fringe produced between the substrate and the hard coated layer. Moreover, use of the primer-coated lenses of the present invention can increase an adhesion property of the hard coated layer.
0093

EXAMPLES

The present invention will be further described with reference to working examples thereof, however, the present invention should not be restricted to these examples.
0094

Example 1

50.2 parts by weight of diallyl phthalate, 49.8 parts by weight of pentaerythritol tetra(3-mercaptopropionate) and 0.1 parts by weight of l-hydroxycyclohexylphenylketone as a photopolymerization initiator are mixed with stirring for two hours in a dark to obtain an UV-curable composition. The obtained composition is spin-coated on a non-alkali glass plate having a thickness of 1 mm, and then irradiated with UV rays for 12 seconds at an irradiation dose of 1000 mW/cm2 to form a coating having a thickness of 1.5 μm.
0095

The obtained coating had no unevenness of coating and no defect in the appearance, exhibited a light transmittance of 98% in a visible radiation area of 400 to 750 nm, and also showed a pencil scratch hardness of 2H. Further, the evaluation concerning adhesion to a glass plate based on a cross cut test (JIS K-5400) indicated that no peeling is observed in the coating. These characteristics are not deteriorated after the coated glass plate is left to stand for 120 hours under the environmental conditions of 70° C. and relative humidity of 95%.

Next, in order to evaluate a peeling strength of the coating, an epoxy resin for sealing a liquid crystal cell is coated and hardened at a thickness of 10 μm on the coated glass plate. The peeling strength observed is a value of 1 kg/cm2 or more, and it is not deteriorated after the resin-coated glass plate is left to stand for 24 hours under the environmental conditions of 70° C. and relative humidity of 95%. Further, the similar test is repeated after the above-described UV-curable composition is left to stand for 15 days at a room temperature (25° C.). No deterioration of the above characteristic is observed.
0096

In addition, the above procedure is repeated by using a color filter comprising RGB picture elements formed on a transparent glass plate in accordance with a transfer process on a laminator, in place of the non-alkali glass plate having a thickness of 1 mm, and then coating and hardening the same UV-curable composition on the color filter in accordance with the similar manner. The coating thus obtained shows that the characteristics are similar to those of the coating on the non-alkali glass plate.
0097

Example 2

The procedure of Example 1 is repeated to form a coating on each of the non-alkali glass plate and color filter with the proviso that diallyl isophthalate is used in place of diallyl phthalate used as one component in the UV-curable composition. The results of evaluation test are substantially the same as those obtained in Example 1.
0098

Example 3

The procedure of Example 1 is repeated to form a coating on each of the non-alkali glass plate and color filter with the proviso that diallyl terephthalate is used in place of diallyl phthalate used as one component in the UV-curable composition. The results of evaluation test are substantially the same as those obtained in Example 1.

0099

Example 4

The procedure of Example 1 is repeated to form a coating on each of the non-alkali glass plate and color filter with the proviso that 0.1 parts by weight of 2-methyl-1-[4-(methylthio)phenyl]-2-morpholino-propane-1-one is added in place of 1-hydroxycyclohexylphenylketone used as one component, photopolymerization initiator, in the UV-curable composition. The results of evaluation test are substantially the same as those obtained in Example 1.
0100

Comparative Example 1

136 g of methyl trimethoxy silane, 198 g of phenyl trimethoxy silane and 32.2 g of dianhydride of 3,3',4,4'-benzophenone tetracarboxylic acid are dissolved in 140 g of γ-butylolactone and 421 g of 3-methyl-3-methoxybutanol, and 118 g of a distilled water is added with stirring at 30° C. After stirring for one hour, reflux is made at a bath temperature of 135° C. for 2 hours to distill off alcohol and water components. After the temperature of the solution is reduced to 80° C., 38.3 g of γ-aminopropyl methyldiethoxysilane, 355 g of 3-methyl-3-methoxybutanol and 133 g of γ-Butylolactone are added to the solution, and the solution is stirred for 2 hours at the same temperature. After cooling to a room temperature, the solution is diluted with 60 g of 3-methyl-3-methoxybutanol. The obtained solution of siloxane oligomer is coated on a non-alkali glass plate having a thickness of 1 mm, and is dried with a hot air at 100° C. for 5 minutes to thereby obtain a cured coating. The solution is gradually gelled, and the coating had a poor smoothness. A transparency is also poor, that is, the light transmittance is only 28% in a visible radiation area of 400 to 750 nm. The pencil scratch hardness is 2B. The adhesion to a glass plate is evaluated with reference to a cross cut test (JIS K-5400) to confirm that all the lattice patterns of the coating are peeled off from the glass plate. Further, the coated glass plate is left to stand for 120 hours under the environmental conditions of 70° C. and relative humidity of 95% to confirm that the lattice patterns are partially peeled off from the glass plate. Furthermore, the above-described solution of siloxane oligomer is left to stand for one week at a room temperature. The solution is gelled, and thus a solid product is formed.
0101

Comparative Example 2

The procedure of Comparative Example 1 is repeated with the proviso that 38.3 g of γ-aminopropyl methyldiethoxysilane is omitted in the preparation of the solution. The obtained solution is coated on the non-alkali glass plate as in Comparative Example 1, and the same evaluation tests are made. The cross cut test (JIS K-5400) indicated that all the lattice patterns are peeled off from the glass plate.
0102

Example 5

(1) Preparation of an Adhesive 100.4 parts by weight of diallyl phthalate, 99.6 parts by weight of pentaerythritol tetra(3-mercaptopropionate) and 0.1 parts by weight of 1-hydroxy cyclohexyl phenylkentone as a photopolymerization initiator are mixed with stirring for 2 hours in a dark to obtain an adhesive.

(2) Production of an Antireflective Glass Having a Scattering-Preventing Function A two-layered antireflective layer, consisting of titanium oxide at λ/2 and magnesium fluoride at λ/4 (λ means 550 nm) as an antireflective layer, is formed on one surface of the polyethylene terephthalate film having a thickness of 125 μm in accordance with the vacuum deposition method to obtain a plastic film having a reflecting-prevention function. Next, the adhesive prepared in the above step (1) is coated on a surface having no antireflective treatment of the plastic film in accordance with a die process, the plastic film as coated is laminated and adhered to a glass, and the laminate is irradiated with UV rays from a metal halide lamp to thereby harden the adhesive. An antireflective glass having a scattering-preventing function is thus obtained.
0103

The characteristics of the obtained glass are evaluated in accordance with the manner described hereinafter. The results of evaluation are summarized in the following Table 1.

1) Light Transmittance

A light transmittance of the glass at the wavelength of 550 nm is determined on the spectrophotometer for UV and visible radiations.

2) Shock Resistance Test

A steel ball of 225 g is fallen to a central portion of the test specimen of 30 cm×30 cm from a height of 3 m to observe an appearance of the damaged glass. Observation is made with regard to whether the glass is broken or bored to form a hole, whether the glass is scattered or flown into pieces, and whether the plastic film is separated from the glass.

3) Heat and Humidity Resistance Test

An appearance of the test specimen is observed, after it is left to stand for 120 hours under the environmental conditions of the temperature of 70° C. and the relative humidity of 95%.
0104

Example 6

The procedure of Example 5 is repeated to obtain an antireflective glass having a scattering-preventing function with the proviso that in the method of obtaining the scattering-preventing antireflective glass by coating the previously prepared adhesive on a surface having no antireflective treatment of the polyethylene terephthalate film having a reflection-preventing function in accordance with a die process, laminating and adhering the film as coated to a glass, and irradiating the laminate with UV rays from a metal halide lamp to thereby harden the adhesive, the polyethylene terephthalate film is laminated and adhered to both surfaces of the glass. The evaluation results for the characteristics of the obtained glass are summarized in the following Table 1.
0105

Comparative Example 3

A single surface of the glass which is the same as that used in Example 5 is directly subjected to a vapor deposition treatment similar to that of Example 5 to form an antireflective layer. The evaluation results for the characteristics of the obtained glass are summarized in the following Table 1.
0106

TABLE 1

| Example No. | light transmittance | test of shock resistance | test of heat and humidity resistance |
|---|---|---|---|
| Ex. 5 | 99% | no ball goes through glass | passed |
| Ex. 6 | 99.4% | no ball goes through glass | passed |

TABLE 1-continued

| Example No. | light transmittance | test of shock resistance | test of heat and humidity resistance |
|---|---|---|---|
| Comparative Ex. 3 | 99.2% | ball goes through and scattering of glass | passed |

0107

Example 7

100.4 parts by weight of diallyl phthalate, 99.6 parts by weight of pentaerythritol tetra(3-mercaptopropionate) and 0.2 parts by weight of 1-hydroxy cyclohexyl phenylkentone as a photopolymerization initiator are mixed with stirring to obtain a polymerizing composition. With regard to the adhesive obtained by using the polymerizing composition, an adhesion property, a heat resistance, a humidity resistance and an appearance are determined in accordance the following evaluation method. The evaluation results are summarized in the following Table 2.

0108

(1) Adhesion Property

After it is coated on the polyethylene terephthalate film having a thickness of 80 μm, the above-described polymerizing composition is irradiated with UV rays from an UV lamp at 80 W to make an UV-cured product, thereby obtaining an adhesive laminated film having an adhesive layer (layer thickness of 25 μm) consisting of the UV-cured product. The laminated film is cut to obtain a test film having a width of 50 mm and a length of 200 mm. An adhesive power (N/cm) of the test film at 180° peeling is determined in accordance with the method described in the Japanese Industrial Standard, JIS-Z-0237.

0109

(2) Heat Resistance and Humidity Resistance

After the above-described polymerizing composition is coated on a glass plate (thickness: 5 mm) so that the thickness after curing becomes 50 μm, the coated composition is irradiated with UV rays from an UV lamp at 80 W to form an UV-cured product, thereby obtaining an adhesive laminated plate having an adhesive layer consisting of the UV-cured product.

0110

A polarizing plate comprising a polarizing film of polyvinyl alcohol having a thickness of 50 μm, both sides of said film being sandwiched with a film of cellulose triacetate having a thickness of 70μm, is laminated to an adhesive layer-carrying surface of the adhesive laminated plate by pressing them with rollers to produce a glass-laminated polarizing plate. With regard to the thus obtained laminated polarizing plate, a heat resistance test (left to stand at 90° C. for 120 hours) and a humidity resistance test (left to stand at 70° C. and 95% RH for 120 hours) are made, and also its spectral transmittance (average) at 750 nm to 350 nm is determined on the spectrophotometer for UV and visible radiations, "U-4000" (produced by Hitachi Co.,Ltd.) to evaluate a variation thereof.

0111

Further, the above-described procedure is repeated by using a phase difference plate in place of the polarizing plate, and the determination is made in accordance with the similar method. The phase difference plate used in this determination is a phase difference plate comprising a phase difference film of poly vinyl alcohol having a thickness of 50 μm, both sides of said film being sandwiched with a film of cellulose triacetate having a thickness of 70 μm.

0112

Furthermore, the above-described procedure is repeated by using in place of the polarizing plate an elliptic polarizing plate comprising a cellulose triacetate film (70 μm)/a polarizing film (50 μm)/a cellulose triacetate film (70 μm)/an adhesive film (50 μm)/a cellulose triacetate film (70 μm)/a phase difference film (50 μm)/a cellulose triacetate film (70 μm), and the determination is made in accordance with the similar method.

0113

(3) Appearance

After the above-described durability test, an appearance of the test specimen is visually inspected to evaluate under the following criteria:

no change is resulted - - - ○ foaming or film separation is resulted - - - ×

0114

Example 8

The procedure of Example 7 is repeated with the proviso that diallyl phthalate is replaced with diallyl isophthalate as one component of the polymerizing composition for forming an adhesive. The evaluation results are summarized in the following Table 2.

0115

Example 9

The procedure of Example 7 is repeated with the proviso that 0.2 parts by weight of 2-methyl-1-[4-(methylthio) phenyl]-2-morpholino-propane-1-one is added as a photopolymerization initiator to the polymerizing composition in place of addition of 1-hydroxy cyclohexyl phenylketone. The evaluation results are summarized in the following Table 2.

0116

Example 10

The procedure of Example 7 is repeated with the proviso that diallyl phthalate is replaced with diallyl terephthalate as one component of the polymerizing composition. The evaluation results are summarized in the following Table 2.

0117

Comparative Example 4

A polymerizing composition is prepared by adding 0.1 parts by weight of benzoyl peroxide as a photopolymerization initiator to 100 parts by weight of a blend of n-butyl acrylic acid:acrylic acid=99:5 (weight ratio), and the polymerizing composition is polymerized in toluene to obtain a solution of the acrylic copolymer. To the resulting solution of the acrylic copolymer, 1.0 parts by weight, based on 100 parts by weight of a solid content of the solution of the acrylic copolymer, of an isocyanate compound (trade name "Colonate L"; produced by Nihon Polyurethane Co.) and 0.1 parts by weight of γ-glycidoxypropyltrimethoxy silane are added, and are mixed with stirring to obtain an adhesive composition. The procedure of Example 7 is repeated with the proviso that the obtained adhesive composition is used in place of the adhesive of the present invention in order to form an adhesive layer. The evaluation results are summarized in the following Table 2.

0118

Comparative Example 5

The procedure of Comparative Example 4 is repeated with the proviso that 1.0 parts by weight of trimethoxysilane propylisocyanate is added to 100 parts by weight, solid content, of the solution of the acrylic copolymer of Comparative Example 4 to obtain a composition which is used herein as an adhesive composition. The evaluation results are summarized in the following Table 2.

0119

Example 11

50.4 parts by weight of diallyl phthalate, 49.6 parts by weight of pentaerythritol tetra(3-mercaptopropionate) and 0.1 parts by weight of 2,2-dimethoxy-1,2-diphenylethane-1-one as a photopolymerization initiator are mixed with stirring in a dark room to obtain a polymerizing composition.

0120

After the polymerizing composition is coated on one surface of the release film consisting of polyvinyl chloride film having a thickness of 25 μm to obtain a layer thickness of 20 μm, the above-described polymerizing composition is irradiated with UV rays from an UV lamp at 80 W to form an adhesive layer consisting of an UV-cured product of said composition. Then, a polarizing plate comprising a polarizing film of polyvinyl alcohol having a thickness of 50 μm, both sides of said film being sandwiched with a film of cellulose triacetate having a thickness of 70 μm, is further laminated to and over the formed adhesive layer to make a laminated polarizing film.

0121

Next, using a roll heating-type pressing apparatus, the above-described laminated polarizing film is laminated onto a transparent glass plate (thickness: 5 mm) under the application of pressing power from rollers, while peeling the release film, to obtain a glass-laminated polarizing plate. With regard to the obtained laminated polarizing plate, a heat resistance and a humidity resistance are determined in accordance with the manner similar to that of Example 7, and also its appearance is evaluated with reference to the criteria similar to those of Example 7.

0122

Further, the above-described evaluation procedures are repeated by using a phase difference plate and an elliptic polarizing plate, both are identical with those used in Example 7, in place of the polarizing plate. The results are summarized in the following Table 2.

0123

TABLE 2

| evaluation of characteristics | Ex. 7 | Ex. 8 | Ex. 9 | Ex. 10 | Comp. Ex. 4 | Comp. Ex. 5 | Ex. 11 |
|---|---|---|---|---|---|---|---|
| adhesion property (N/cm) | 1.3 | 1.3 | 1.3 | 1.3 | 0.7 | 0.8 | — |
| heat resistance & humidity resistance (av. of spectral trans. at 750 to 350 nm: %) | | | | | | | |
| polar. plate | | | | | | | |
| heat r. | | | | | | | |
| b. test | 61.9 | 61.8 | 62.0 | 61.8 | 59.8 | 59.9 | 61.6 |
| a. test | 60.7 | 60.8 | 61.1 | 60.7 | 19.0 | 18.0 | 60.9 |
| hum. r. | | | | | | | |
| b. test | 61.8 | 61.9 | 61.9 | 61.8 | 59.9 | 59.8 | 61.7 |
| a. test | 60.4 | 60.1 | 60.6 | 60.2 | 17.6 | 16.9 | 60.8 |
| phase diff. plate | | | | | | | |
| heat r. | | | | | | | |
| b. test | 51.8 | 52.0 | 51.9 | 52.0 | 48.9 | 48.8 | 51.7 |
| a. test | 50.3 | 51.0 | 50.6 | 50.2 | 12.0 | 11.8 | 50.9 |
| hum. r. | | | | | | | |
| b. test | 51.9 | 51.9 | 51.7 | 51.8 | 47.9 | 49.0 | 51.9 |
| a. test | 50.0 | 49.8 | 50.2 | 49.9 | 11.0 | 10.5 | 50.2 |
| ellip. polar. plate | | | | | | | |
| heat r. | | | | | | | |
| b. test | 39.1 | 38.8 | 39.0 | 39.0 | 30.0 | 30.3 | 39.1 |
| a. test | 36.6 | 37.0 | 36.8 | 36.9 | 5.5 | 3.9 | 37.8 |
| hum. r. | | | | | | | |
| b. test | 39.0 | 39.0 | 38.8 | 38.9 | 31.0 | 30.7 | 38.8 |
| a. test | 36.9 | 36.7 | 37.1 | 36.8 | 3.1 | 2.8 | 37.0 |
| appearance | ◯ | ◯ | ◯ | ◯ | X | X | ◯ |

Note:
trans.—transmittance,
polar.—polarizing,
ellip.—elliptic,
heat r.—heat resistance,
hum. r.—humidity resistance,
b. test—before test,
a. test—after test.

[0124]

Example 12

A polymerizing composition which is prepared by mixing 100.4 parts by weight of diallyl isophthalate, 99.6 parts by weight of pentaerythritol tetra(3-mercaptopropionate), 0.2 parts by weight of a mixture of 2-hydroxy-2-methyl-1-phenylpropane-1-one and bisacylphosphine oxide (produced by Ciba-Geigy (Japan) Ltd.; trade name "CGI-1700") as a photopolymerization initiator, and 0.6 parts by weight of 2,2-methylenebis[4-(1,1,3,3-tetramethylbutyl)-6-(2H-benzotriazole-2-yl)phenol] (produced by Kyodo Yakuhin Kabushikikaisha; trade name "Biosorb 583") as a stabilizer in a dark is coated on a polyethylene terephthalate film having a thickness of 125 $\mu$m, and the coated polymerizing composition is immediately irradiated with UV rays from a metal halide lamp to form a flexible resin layer having a layer thickness of 0.1 mm. The UV irradiation time is 300 seconds, and an output of the lamp is 120 W.

The thus obtained sheet had a high shock-absorbing power, along with an excellent flexibility. The shock resistance is determined in accordance with the following method.

A test sample is prepared by adhering the sheet to both surfaces of the glass plate having a thickness of 1.2 mm, and a steel ball of 16 g is fallen to the test sample from a height of 127 cm. No breakage and scattering of the glass is observed.

[0125]

Example 13

The procedure of Example 12 is repeated to obtain a sheet with the proviso that diallyl isophthalate is replaced with diallyl terephthalate. The shock resistance test is made in accordance with the method described in Example 12. No breakage and scattering of the glass is observed.

[0126]

Example 14

The procedure of Example 12 is repeated to obtain a shock-absorbing material with the proviso that diallyl isophthalate is replaced with the same amount of diallyl phthalate, and 2 parts by weight of 2-methyl-1-[4-(methylthio)phenyl]-2-morpholino-propane-1-one and 0.01 parts by weight of 2-benzyl-2-dimethylamino-1-(4-morpholinophenyl)-1-butane-1-one are added as a photopolymerization initiator. The shock resistance test is made in accordance with the method described in Example 12. No breakage and scattering of the glass is observed.

[0127]

Example 15

100.4 parts by weight of diallyl isophthalate, 99.6 parts by weight of pentaerythritol tetra(3-mercaptopropionate), 0.2 parts by weight of a mixture of 2-hydroxy-2-methyl-1-phenylpropane-1-one and bisacylphosphine oxide (produced by Ciba-Geigy (Japan) Ltd.; trade name "CGI-1700") as a photopolymerization initiator, and 0.6 parts by weight of 2,2-methylene-bis[4-(1,1,3,3-tetramethylbutyl)-6-(2H-benzotriazole-2-yl)phenol] (produced by Kyodo Yakuhin Kabushikikaisha; trade name "Biosorb 583") as an UV-absorbing agent are mixed in a dark. The obtained polymerizing composition, while it is molded in accordance with a die process to obtain a sheet-like product, is irradiated with UV rays from a metal halide lamp to obtain a sheet having a thickness of 0.15 mm. The UV irradiation time is 300 seconds, and an output of the lamp is 120 W.

The obtained sheet had a high transparency. Further, since it has an excellent flexibility, the sheet could be directly adhered to the glass windows and the like of the constructions, and its adhesion could be semi-permanently maintained. Furthermore, the adhered sheet can be easily peeled off from the glass surface by hand, without causing stain formation and damages in said surface.

[0128]

With regard to the obtained sheet, its transmittance of visible radiations and its effect of cutting or cutting UV rays are determined in accordance with the manner described hereinafter. The results are summarized in the following Table 3.

1) Transmittance of Visible Radiations

A transmittance of the sheet at the wavelength of 550 nm is determined on the spectrophotometer for UV and visible radiations.

2) Transmittance of UV Rays

A transmittance of the sheet at the wavelength of 300 nm is determined on the spectrophotometer for UV and visible radiations. The UV cutting effect could be appreciated from the results.

[0129]

Example 16

A two-layered antireflective layer consisting of TiO2 ($\lambda/2$) and MgF2 ($\lambda/4$) ($\lambda$ means 550 nm) as an antireflective layer is formed on one surface of the UV-cured product obtained in Example 15 in accordance with the vacuum deposition method.

The obtained sheet had a transmittance of visible radiations of 90% (average of 350 to 750 nm). The UV cutting effect is determined in the manner similar to that of Example 15, and the results are summarized in the following Table 3.

[0130]

Example 17

The procedure of Example 15 is repeated to obtain an UV-cutting sheet with the proviso that diallyl isophthalate is replaced with diallyl terephthalate. The results of evaluation are summarized in the following Table 3.

[0131]

Example 18

The procedure of Example 15 is repeated to obtain an UV-cutting sheet with the proviso that diallyl isophthalate is replaced with the same amount of diallyl phthalate, and 2 parts by weight of 2-methyl-1-[4-(methylthio)phenyl]-2-morpholino-propane-1-one and 0.01 parts by weight of 2-benzyl-2-dimethylamino-1-(4-morpholinophenyl)-1-butane-1-one are added as a photopolymerization initiator. The results of evaluation are summarized in the following Table 3.

[0132]

TABLE 3

| Example No. | transmittance of visible radiations | transmittance of UV rays |
| --- | --- | --- |
| 15 | 90% | 0% |
| 16 | 98% | 0% |

TABLE 3-continued

| Example No. | transmittance of visible radiations | transmittance of UV rays |
|---|---|---|
| 17 | 90% | 0% |
| 18 | 91% | 0% |

[0133]

Example 19

100.4 parts by weight of diallyl isophthalate, 99.6 parts by weight of pentaerythritol tetra(3-mercaptopropionate), 0.2 parts by weight of a mixture of 2-hydroxy-2-methyl-1-phenylpropane-1-one and bisacylphosphine oxide (produced by Ciba-Geigy (Japan) Ltd.; trade name "CGI-1700") as a photopolymerization initiator, and 0.6 parts by weight of 2,2-methylene-bis[4-(1,1,3,3-tetramethylbutyl)-6-(2H-benzotriazole-2-yl)phenol] (produced by Kyodo Yakuhin Kabushikikaisha; trade name "Biosorb 583") as an UV-absorbing agent are mixed in a dark. The obtained polymerizing composition, while it is molded in accordance with a roll coater process to obtain a sheet-like product, is irradiated with UV rays from a metal halide lamp to obtain a sheet having a thickness of 0.2 mm. The UV irradiation time is 300 seconds, and an output of the lamp is 120 W. The thus obtained UV-cured product is then cut in conformity with the size of the image-displaying surface of the television to obtain a filter.

The filter had a high transparency. Further, since it has an excellent flexibility, the filter could be directly adhered to the image-displaying surface of the television, and its adhesion can be semi-permanently maintained. Furthermore, the adhered filter could be easily peeled off from the image-displaying surface by hand, without causing stain formation and damages in said surface.

[0134]

With regard to the obtained filter, its transmittance of visible radiations, transmittance of UV rays (UV-cutting off effect) and effects of inhibiting generation of electrostatic charges are determined in accordance with the manners described hereinafter, respectively. The results are summarized in the following Table 4.

1) Transmittance of Visible Radiations

A transmittance of the filter at the wavelength of 550 nm is determined on the spectrophotometer for UV and visible radiations.

2) Transmittance of UV Rays

A transmittance of the filter at the wavelength of 300 nm is determined on the spectrophotometer for UV and visible radiations.

3) Effects of Inhibiting Generation of Electrostatic Charges

A dielectric constant of the filter is determined in accordance with the method described in the Japanese Industrial Standard, JIS K6911.

[0135]

Example 20

By the vacuum deposition method, a two-layer antireflective layer consisting of TiO2 at $\lambda/2$ as an antireflective layer, and MgF2 at $\lambda/4$ ($\lambda$ means 550 nm) formed on the TiO2 layer, is formed on one of surfaces of the UV-cured product obtained in Example 1.

With regard to the obtained filter, its transmittance of visible radiations, UV-cutting off effect and effects of inhibiting generation of electrostatic charges are determined in the above-described manner, and the results are summarized in the following Table 4.

[0136]

Example 21

The procedure of Example 19 is repeated to obtain a TV filter with the proviso that diallyl isophthalate is replaced with diallyl terephthalate. The results of evaluation are summarized in the following Table 4.

[0137]

Example 22

The procedure of Example 19 is repeated to obtain a TV filter with the proviso that diallyl isophthalate is replaced with the same amount of diallyl phthalate, and 2 parts by weight of 2-methyl-1-[4-(methylthio)phenyl]-2-morpholino-propane-1-one and 0.01 parts by weight of 2-benzyl-2-dimethylamino-1-(4-morpholinophenyl)-1-butane-1-one are added as a photopolymerization initiator. The results of evaluation are summarized in the following Table 4.

[0138]

TABLE 4

| Example No. | transmittance of visible radiations | transmittance of UV rays | inhibition of static charges* |
|---|---|---|---|
| 19 | 91% | 0% | 2.2 |
| 20 | 99% | 0% | 2.1 |
| 21 | 91% | 0% | 2.2 |
| 22 | 91% | 0% | 2.2 |

*Effects of inhibiting generation of electrostatic charges: dielectric constant at 1 MHz.

[0139]

Example 23

A surface of 100-$\mu$m thick polyethylene terephthalate film having a vacuum-deposited ITO layer of the layer thickness of 150 Å, the surface being opposed to said ITO layer, is coated with a polymerizing composition which is prepared by mixing 100.4 parts by weight of diallyl isophthalate, 99.6 parts by weight of pentaerythritol tetra(3-mercaptopropionate), 0.2 parts by weight of a mixture of 2-hydroxy-2-methyl-1-phenylpropane-1-one and bisacylphosphine oxide (produced by Ciba-Geigy (Japan) Ltd.; trade name "CGI-1700") as a photopolymerization initiator, and 0.6 parts by weight of 2,2-methylene-bis[4-(1,1,3,3-tetramethylbutyl)-6-(2H-benzotriazole-2-yl)phenol] (produced by Kyodo Yakuhin Kabushikikaisha; trade name "Biosorb 583") as an UV-absorbing agent are mixed in a dark room. Immediately after coating, the coated polymerizing composition is irradiated with UV rays from a metal halide lamp to obtain a flexible resin layer having a layer thickness of 250 $\mu$m. The UV irradiation time is 300 seconds, and an output of the lamp is 120 W.

The thus obtained VDT filter had a high transparency and since it had an excellent flexibility, a flexible resin layer side of the filter could be directly adhered to a CRT surface of the VDTs and its adhesion could be semi-permanently maintained. Further, the adhered filter could be easily peeled off from the CRT surface by hand, without causing stain formation and damages in said surface.

[0140]

Figure 3:
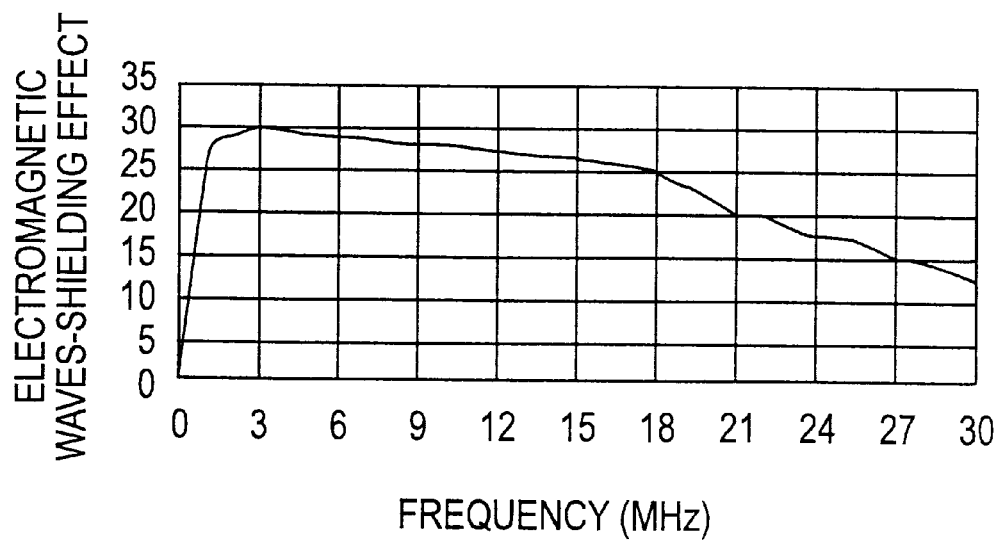
FIG. 3 is a graph showing the electromagnetic waves-shielding effect provided by the filter for VDTs produced in Example 23.

With regard to the obtained filter, its transmittance of visible radiations, transmittance of UV rays and effects of inhibiting generation of electrostatic charges are determined in accordance with the manners described hereinafter, respectively, and the results are summarized in the following Table 5. Further, electromagnetic waves-shielding effects determined in accordance with the following method are plotted in FIG. 3.

1) Transmittance of Visible Radiations

A transmittance of the filter at the wavelength of 550 nm is determined on the spectrophotometer for UV and visible radiations.

2) Transmittance of UV Rays

A transmittance of the filter at the wavelength of 300 nm is determined on the spectrophotometer for UV and visible radiations. The UV cutting effect could be appreciated from the results.

3) Effects of Inhibiting Generation of Electrostatic Charges

A dielectric constant of the filter is determined in accordance with the method described in the Japanese Industrial Standard, JIS K6911.

4) Electromagnetic Waves-Shielding Effects

Electromagnetic waves-shielding effects of the filter is determined in accordance with the Advantest method.
0141

Example 24

A two-layered antireflective layer consisting of TiO2 ($\lambda/2$) and MgF2 ($\lambda/4$) ($\lambda$ means 550 nm) as an antireflective layer is formed on a vacuum-deposited ITO layer of the filter obtained in Example 23 in accordance with the vacuum deposition method.

Figure 4:
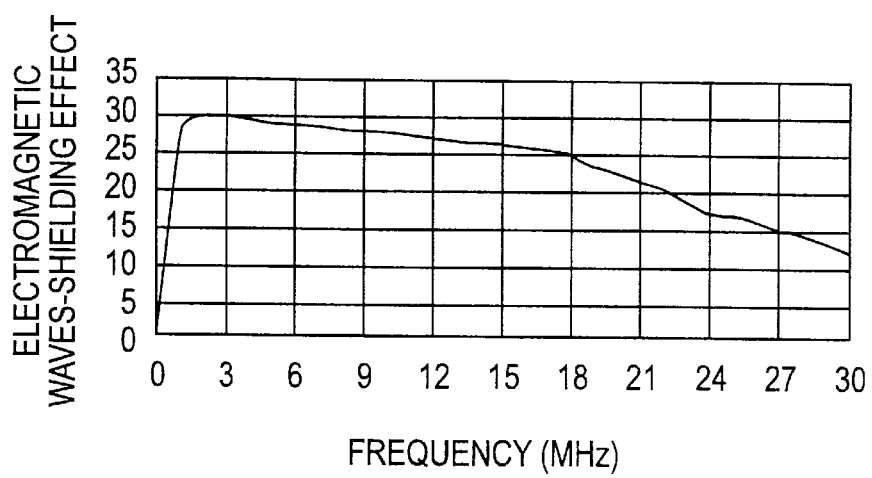
FIG. 4 is a graph showing the electromagnetic waves-shielding effect provided by the filter for VDTs produced in Example 24.

With regard to the obtained filter, its transmittance of visible radiations, transmittance of UV rays and effects of inhibiting generation of electrostatic charges are determined in the above-described manner, and the results are summarized in the following Table 5. The electromagnetic waves-shielding effects are plotted in FIG. 4.
0142

Example 25

Figure 5:
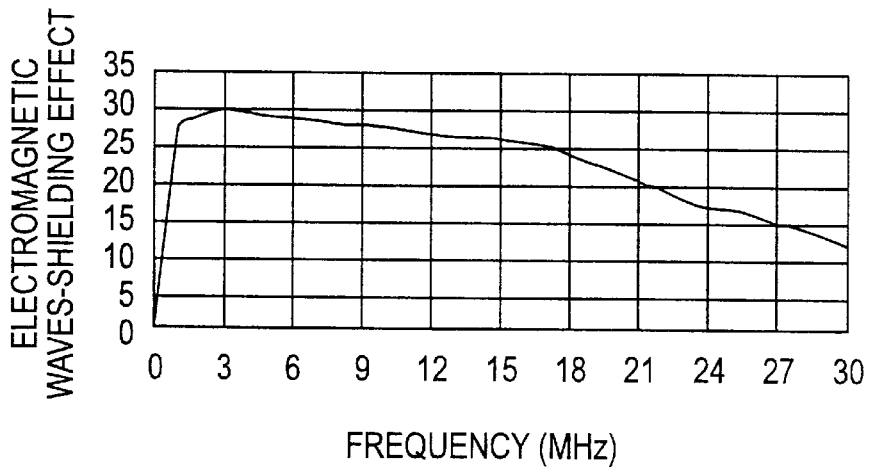
FIG. 5 is a graph showing the electromagnetic waves-shielding effect provided by the filter for VDTs produced in Example 25.

The procedure of Example 23 is repeated to obtain a VDT filter with the proviso that diallyl isophthalate is replaced with diallyl terephthalate. The results of evaluation are summarized in the following Table 5 and FIG. 5.
0143

Example 26

Figure 6:
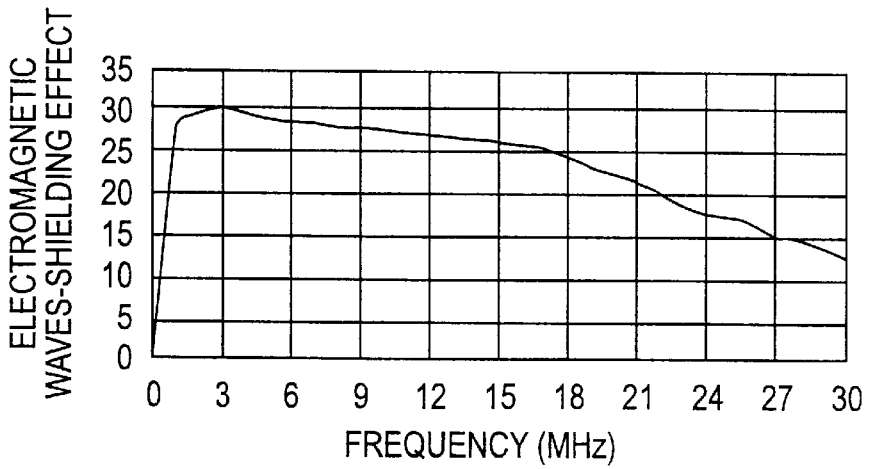
FIG. 6 is a graph showing the electromagnetic waves-shielding effect provided by the filter for VDTs produced in Example 26.

The procedure of Example 23 is repeated to obtain a VDT filter with the proviso that diallyl isophthalate is replaced with the same amount of diallyl phthalate, and 2 parts by weight of 2-methyl-1-[4-(methylthio)phenyl]-2-morpholino-propane-1-one and 0.01 parts by weight of 2-benzyl-2-dimethylamino-1-(4-morpholinophenyl)-1-butane-1-one are added as a photopolymerization initiator. The results of evaluation are summarized in the following Table 5 and FIG. 6.
0144

TABLE 5

| Example No. | transmittance of visible radiations | transmittance of UV rays | inhibition of static charges* |
| --- | --- | --- | --- |
| 23 | 90% | 0% | 2.1 |
| 24 | 98% | 0% | 2.0 |
| 25 | 90% | 0% | 2.1 |
| 26 | 90% | 0% | 2.1 |

*Effects of inhibiting generation of electrostatic charges: dielectric constant at 1 MHz.

0145

Example 27

(1) Preparation of a Primer Composition 13.3 parts by weight of a titanium oxide-zirconium oxide composite sol of methanol dispersion type (solid content of 20% by weight; produced by Shokubai Kasei Kogyo Kabushikikaisha; trade name "Optolake 1120Z"), 40.6 parts by weight of diallyl isophthalate, 39.94 parts by weight of pentaerythritol tetra(3-mercaptopropionate), 0.8 parts by weight of a mixture of 2-hydroxy-2-methyl-1-phenylpropane-1-one and bisacylphosphine oxide (produced by Ciba-Geigy (Japan) Ltd.; trade name "CGI-1700") as a photopolymerization initiator, and 0.7 parts by weight of a silicone surfactant, L-7001 (trade name; produced by Nihon Unicar) as a leveling agent are stirred in a dark to obtain an uniform primer composition. Attention is made so that the primer composition is not exposed to lights.
0146

(2) Coating

After an urethane-based plastic lens having a refractive index (n) of 1.6 is cleaned, the lens is coated with the primer composition prepared in the above step (1) in accordance with a spin coating method. In this spin coating process, the revolution speed is 5000 rpm, and the revolution time is 30 seconds. Immediately after coating, the coated primer composition is irradiated with UV rays from a metal halide lamp at an output of 120 W for 300 seconds to thereby cause UV curing and form a primer layer having a layer thickness of 0.1 $\mu$m.

Next, a hard coated layer (refractive index of 1.62) having a layer thickness of 2.0 $\mu$m is formed on the produced primer layer in accordance with a dip coating method. The hard coating solution used is a high refractive index hard coating solution produced by Shokubai Kasei Kogyo Kabushikikaisha (trade name "PSI-118"). The pulling speed is 100 mm/min and the curing conditions are 2 hours at 110° C. Further, an antireflective multicoating is applied over the hard coated layer by vacuum depositing four thin layers of, from a lens side to an atmosphere side, a mixture of ZrO2 and SiO2 wherein a mixing ratio of ZrO2 and SiO2 based on the weight ratio is 1:1, ZrO2, Ta2O5 and SiO2. Each thin layer had an optical layer thickness of $\lambda 0/4$, $\lambda 0/4$, $\lambda 0/4$ and $\lambda 0/4$ ($\lambda 0$ is 550 nm) in the described order. The thus obtained lens did not show any problem in its appearance. The lens had a transmittance of 99%.
0147

(3) Evaluation

A shock resistance of the lens is determined by conducting a falling ball test in accordance with the guideline described in FDA Standards in which a steel ball having a weight of 16 g is fallen to the lens from a height of 127 cm, followed by observing the lens. In the falling ball test, the lens having a primer layer produced by using the primer composition of the present invention did not cause any problem.

0148

Comparative Example 6

A lens substrate is dipped in a commercially available primer for polycarbonate (produced by Shinetsu Kagaku Kabushikikaisha; trade name "Primer PC"), and then pulled at 100 mm/min, followed by curing at 50° C. for one hour. The layer thickness of the obtained primer layer is 0.6 μm. The lens is produced in accordance with the manner similar to that of Example 27 except for the above-described primer coating, and subjected to the falling ball test. A back surface of the lens is cracked.
0149

Example 28

The procedure of Example 27 is repeated to prepare a primer composition and produce a primer coated lens with the proviso that in the step (1) diallyl isophthalate is replaced with diallyl terephthalate. The obtained lens did not cause any problem in the falling ball test.

What is claimed is:

1. A transparent resin having an adhesive property comprising a cured product of polymerizing composition which consists of:
   (a) at least one of diallyl phthalate, diallyl isophthalate and diallyl terephthalate;
   (b) pentaerythritol tetra(3-mercaptopropionate); and
   (c) photopolymerization initiator.

2. The transparent resin having an adhesive property according to claim 1, wherein said at least one of diallyl phthalate, diallyl isophthalate and diallyl terephthalate, and said pentaerythritol tetra(3-mercaptopropionate) are contained in an equivalent ratio of 2:1 to 1:3.

3. The transparent resin having an adhesive property according to claim 2, wherein said photopolymerization initiator is contained in an amount of 0.005 to 10% by weight.

4. The transparent resin having an adhesive property according to claim 2, wherein said photopolymerization initiator is an ultraviolet curing agent.

5. The transparent resin having an adhesive property according to claim 1, wherein said transparent resin is used as an adhesive agent.

6. The transparent resin having an adhesive property according to claim 5, wherein said photopolymerization initiator is contained in an amount of 0.005 to 10% by weight.

7. The transparent resin having an adhesive property according to claim 5, wherein said transparent resin is used in an adhesion of optical films.

8. An optical laminate resin having an adhesive property, comprising a substrate, a transparent resin having an adhesive property according to claim 5, and an optical film, which are laminated in this order from said substrate.

9. The optical laminate having an adhesive property according to claim 8, wherein said substrate is a glass plate.

10. A optical laminate having an adhesive property, comprising an optical film layer, a transparent resin having an adhesive property according to claim 5, and a releasable film layer.

11. A transparent resin having an adhesive property comprising a cured product of polymerizing composition which consists of:
    (a) at least one of diallyl phthalate, diallyl isophthalate and diallyl terephthalate;
    (b) pentaerythritol tetra (3-mercaptopropionate);
    (c) photopolymerization initiator; and
    (d) an ultraviolet-absorbing agent 12. The transparent resin having an adhesive property according to claim 11, wherein an amount of said ultraviolet-absorbing agent is 0.01 to 3.0% by weight.

13. A composite comprising a laminate of a transparent resin having an adhesive property according to claim 1, and a functional layer having physical properties different from those of said resin.

14. The composite according to claim 13, wherein said functional layer is an antireflective layer.

15. The composite according to claim 13, wherein said functional layer is an optical filter.

16. The composite according to claim 13, wherein said functional layer is a plastic film.

17. The composite according to claim 13, wherein said transparent resin comprises at least one of diallyl phthalate, diallyl isophthalat and diallyl terephthalate, and pentaerythritol tetra(3-mercaptopropionate) in an equivalent ratio of 2:1 to 1:3.

18. A transparent resin having an adhesive property comprising a cured product of polymerizing composition which consists of:
    (a) at least one of diallyl phthalate, diallyl isophthalate and diallyl terephthalate;
    (b) pentaerythritol tetra(3-mercaptopropionate);
    (c) photopolymerization initiator; and
    (d) refractive index-adjusting material.

19. The transparent resin having an adhesive property according to claim 18, wherein said refractive index-adjusting material is a metallic compound.

* * * * *